(12) United States Patent
Goldstein

(10) Patent No.: US 12,024,823 B2
(45) Date of Patent: Jul. 2, 2024

(54) PROCESS FOR REFINING FIBER AND DERIVING CHEMICAL CO-PRODUCTS FROM BIOMASS

(71) Applicant: Yitzac Goldstein, Seattle, WA (US)

(72) Inventor: Yitzac Goldstein, Seattle, WA (US)

( * ) Notice: Subject to any disclaimer, the term of this patent is extended or adjusted under 35 U.S.C. 154(b) by 0 days.

(21) Appl. No.: 17/571,119

(22) Filed: Jan. 7, 2022

(65) Prior Publication Data
US 2023/0220622 A1  Jul. 13, 2023

Related U.S. Application Data

(62) Division of application No. 16/558,094, filed on Aug. 31, 2019, now Pat. No. 11,255,045.

(51) Int. Cl.
| | |
|---|---|
| D21C 11/00 | (2006.01) |
| D21C 3/02 | (2006.01) |
| D21C 9/08 | (2006.01) |
| D21C 11/12 | (2006.01) |

(52) U.S. Cl.
CPC .............. *D21C 9/08* (2013.01); *D21C 3/02* (2013.01); *D21C 11/0007* (2013.01); *D21C 11/0042* (2013.01); *D21C 11/125* (2013.01)

(58) Field of Classification Search
CPC ............................ D21C 3/02; D21C 11/125
See application file for complete search history.

(56) References Cited

U.S. PATENT DOCUMENTS

| | | | | |
|---|---|---|---|---|
| 1,582,317 | A * | 4/1926 | Thomsen | D21C 11/0007 44/605 |
| 3,862,909 | A * | 1/1975 | Copeland | C01B 32/324 502/433 |
| 4,208,245 | A * | 6/1980 | Watkins | D21C 11/125 201/25 |
| 5,171,592 | A | 12/1992 | Holtzapple et al. | |
| 5,529,697 | A * | 6/1996 | Braasch | D21C 11/0028 210/721 |
| 6,183,598 | B1 * | 2/2001 | Myreen | D21C 11/06 162/29 |

\* cited by examiner

*Primary Examiner* — Anthony Calandra
(74) *Attorney, Agent, or Firm* — Robert Brownstein

(57) ABSTRACT

The invention herein disclosed and claimed is a process for refining fiber from lignocellulosic biomass. The process provides refined fiber and agriculturally amenable co-products, with a virtually waste-free systems design.

4 Claims, 46 Drawing Sheets

PROCESS FOR REFINING FIBER AND DERIVING CHEMICAL CO-PRODUCTS FROM BIOMASS

This application discloses and claims only subject matter disclosed in prior application Ser. No. 16/558,094, filed Aug. 31, 2019, and claims only subject matter directed to an invention that is independent and distinct from that claimed in the prior application.

TECHNICAL FIELD

The invention is a process for refining fiber from lignocellulosic biomass.

BACKGROUND OF THE INVENTION

The world is experiencing increasing human populations, increasing rates of fiber consumption, and dwindling natural resources. Cotton, the world's dominant natural fiber for textiles, now competes with food crops in a world where per capita farmland stands at half the level 50 years ago. Non-biodegradable petroleum-based fibers now dominate textile markets, and are positioned for continued rapid expansion, but critical concerns over air, land, and water pollution caused by this industry are causing widespread opposition. Wood, the dominant source for paper and other pulp products, cannot supply predicted growth trends without threatening wildlife habitats, and destroying the world's much needed oxygen sources.

The world needs alternative fiber sources to deal with these pressing problems. Non-cotton, non-wood natural fibers may provide one solution, especially when sourced from waste products of the food industry. In order for such alternative natural fibers to enter the marketplace, they have to be refined using wet chemistry to eliminate non-fiber natural components. Lignocellulosic biomass residues comprise the largest source of available but unused fibers. Such biomass sources typically contain long, repeating units of "bast" fibers. These bast fibers must be refined to remove the gummy interstices gluing cellulosic fiber units to non-fibrous tissues and the fiber bundles to each other. Prior art refining liquors, typically based on alkaline chemicals, comprise high levels of sodium cations. After use, the associated spent fiber refining liquors (FRLs) require large infrastructure, energy, and expense to manage.

The need is growing for additional sources of fiber; and for efficient, resource-conserving, and inexpensive processes for extracting and refining those fibers.

BRIEF DESCRIPTION OF THE INVENTION

The process invention herein disclosed and claimed can reduce process pollution issues, provides reuse of process chemicals in subsequent process steps, and agriculturally amenable co-products that can be used as nutrients for food crops as well as for new biomass from which fiber may be extracted and refined.

In this process invention, and all its embodiments, the refined fiber products are essentially the same. However, by slightly modifying the process, one can yield a rich variety of co-products, some of which can be reused for the process; others of which have value for agricultural use.

The core process comprises refining the fiber using an FRL that essentially removes the gummy inter-fiber interstices. The spent FRL that remains after the process concludes, because of the FRL's makeup, may yield useful co-products amenable to agriculture.

Where the process is augmented, the spent FRL can be treated to provide an even greater variety of co-products, some of which can be reused for subsequent process steps. Where the process is augmented with combustion sub-processes, the heat may be used for energy-requiring process steps.

Different embodiments of the process yield different combinations of co-products. Thus, the process can be tailored to provide optimally efficient processing and a partially self-sustaining process by virtue of energy and derived chemical reuse. It can also be tailored to the geographical, economic and national constraints that exist in locations wherein the process is practiced.

BRIEF DESCRIPTIONS OF THE DRAWINGS

FIG. 1 shows an embodiment of the process beginning with lignocellulosic biomass, refining said biomass with a first FRL, with alkaline chemicals within said FRL comprising potassium cations, and calcium and/or magnesium cations, in which the alkaline chemicals within the FRL contains no more than 30 percent sodium cations, and ending with refined fiber and spent FRL co-products FIG. 2 shows an embodiment of the process beginning with lignocellulosic biomass, refining said biomass with a second FRL, with alkaline chemicals within said FRL comprising a minimum of 70 percent from at least one of the group of potassium, ammonium, calcium, and magnesium cations, in which the alkaline chemicals within said second FRL contain no more than 30 percent sodium cations, producing refined fiber and a spent FRL; and treating said FRL with a non-carbonic short-chain carboxylic acid; and capturing carboxylate salts and other co-products from the treated spent FRL.

FIG. 3 shows a process as in FIG. 1 wherein the first FRL comprises no more than 30 percent sodium cations, at least 50 percent potassium cations, and calcium and/or magnesium cations.

FIG. 4 shows a process as in FIG. 1 wherein the first FRL comprises no more than 30 percent sodium cations, at least 50 percent potassium cations and 20-50 percent of calcium cations.

FIG. 5 shows a process as in FIG. 1 wherein the first FRL comprises no more than 30 percent sodium cations, at least 50 percent potassium cations and 20-50 percent magnesium cations.

FIG. 6 shows a process as in FIG. 1 wherein the first FRL comprises no more than 30 percent sodium cations, at least 50 percent potassium cations and 20-50 percent combination of calcium and magnesium cations.

Figure 2:
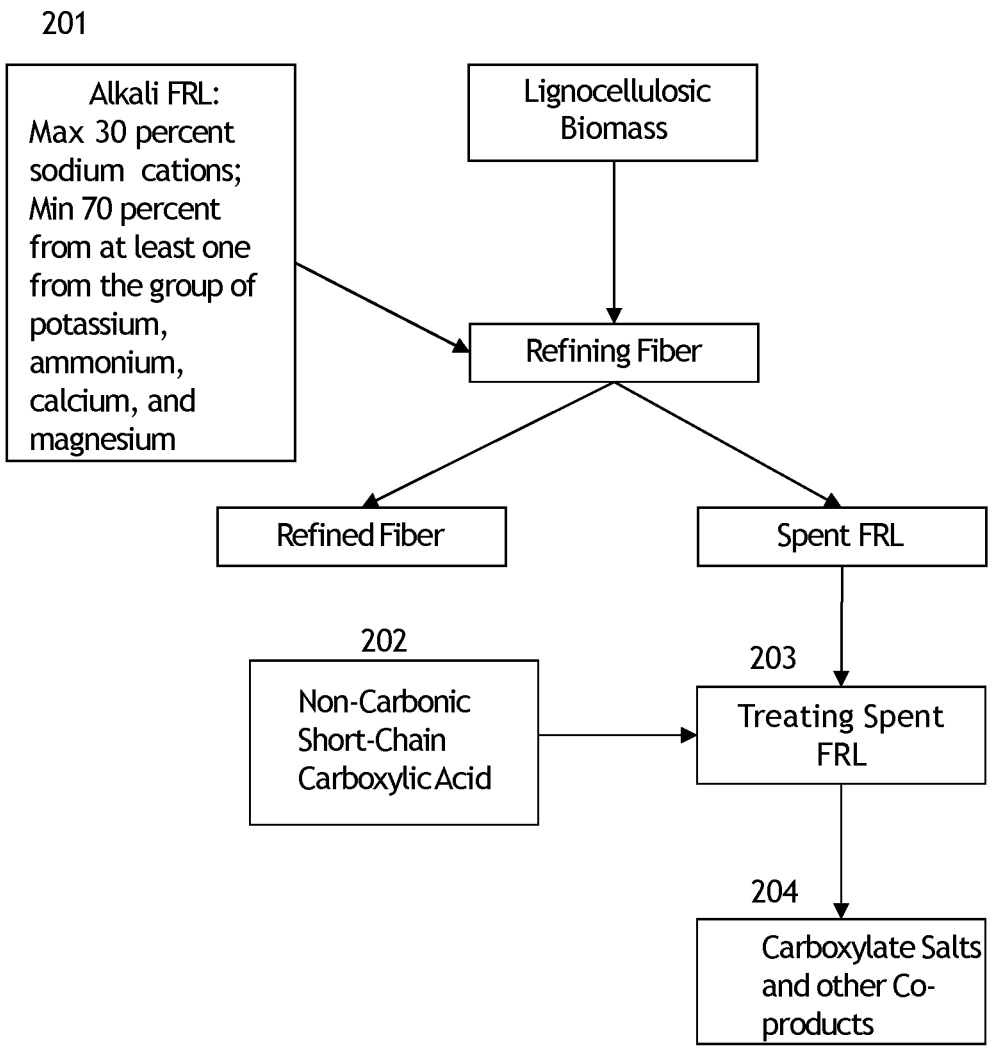
Figure 12:
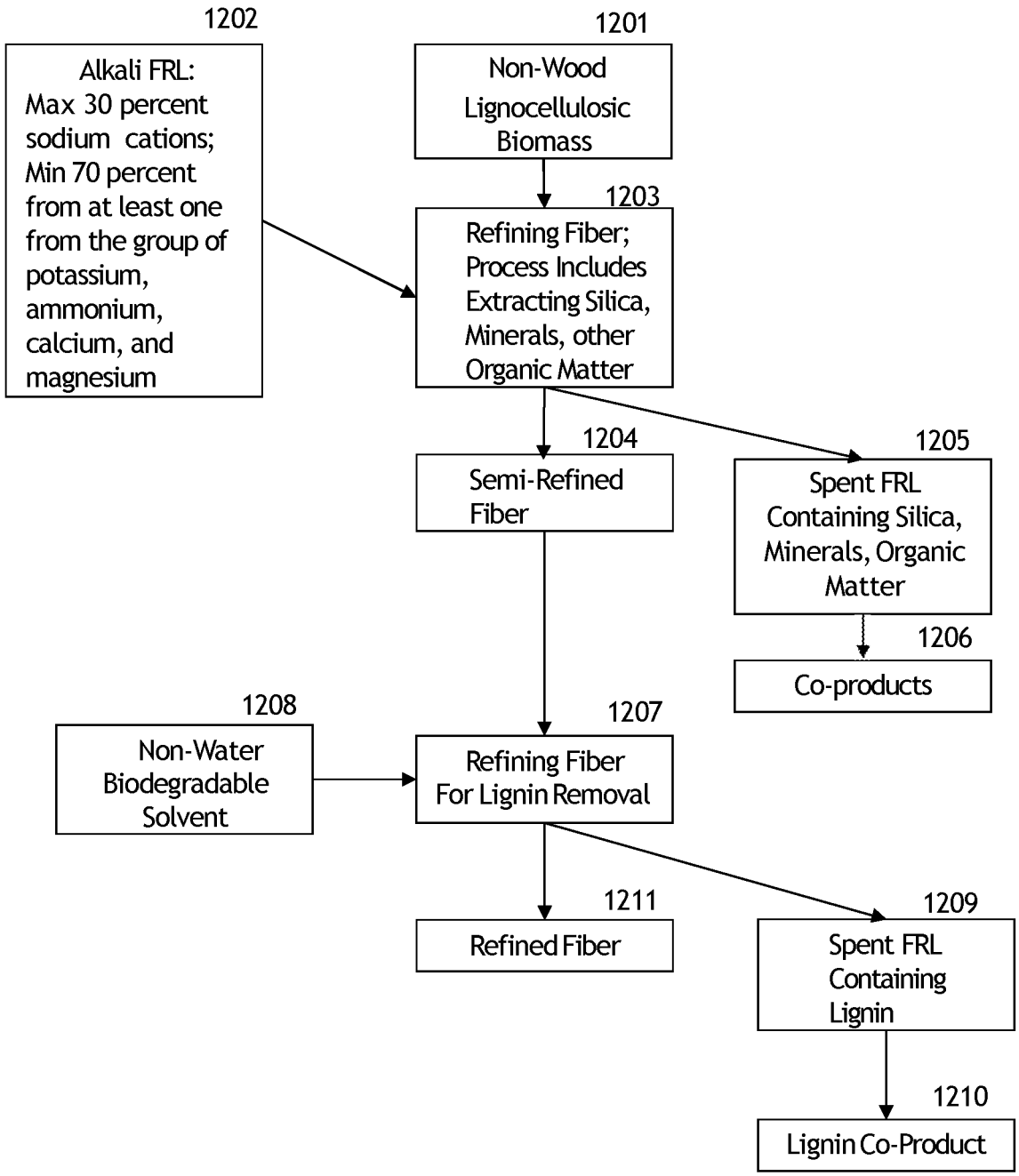

FIG. 12 shows a process wherein a second FRL, as described in FIG. 2 is used, wherein the fiber refining process includes extracting silica, minerals, and other organic matter from a non-wood lignocellulosic biomass source, resulting in a semi-refined fiber, and a spent FRL containing silica, minerals, and organic matter; and capturing coproducts from the spent said FRL; and, a second fiber refining step, with the semi-refined fiber as the raw material, using a non-water biodegradable solvent to remove lignin from said fiber; and resulting in refined fiber and spent FRL containing lignin; and capturing a lignin co-product.

Figure 1:
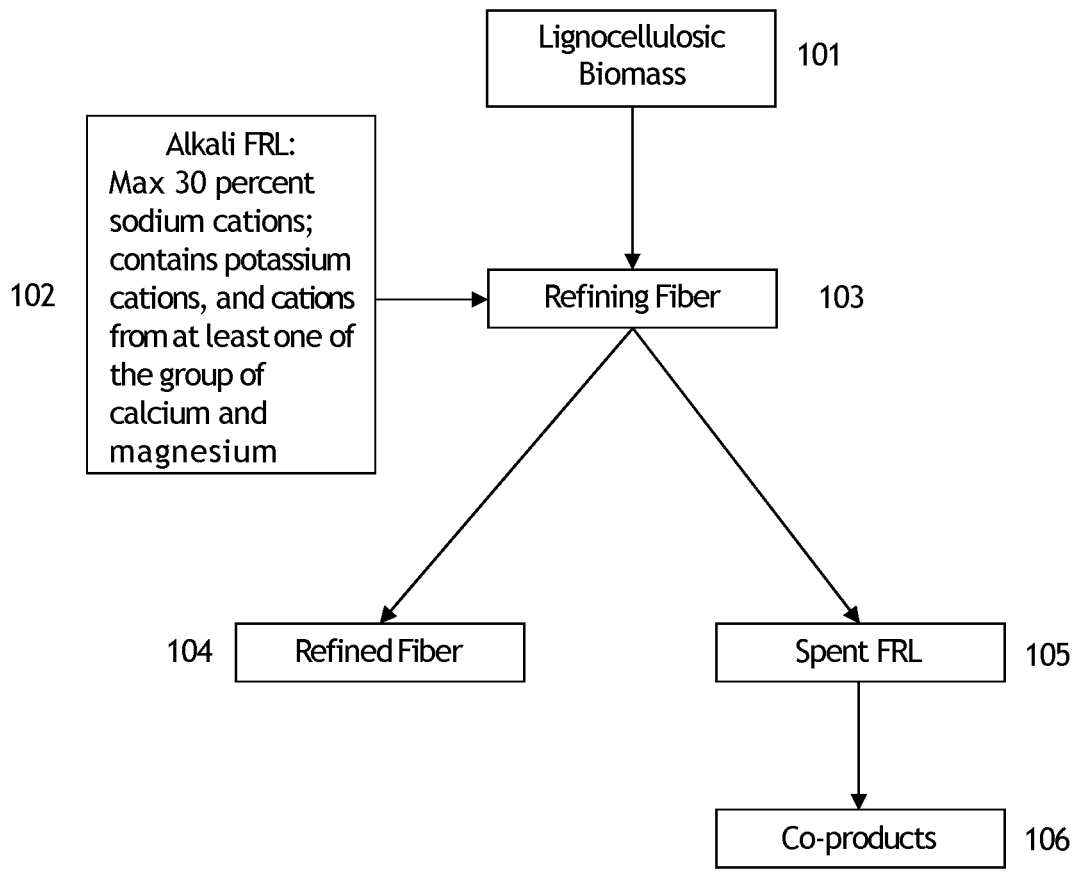
Figure 13:
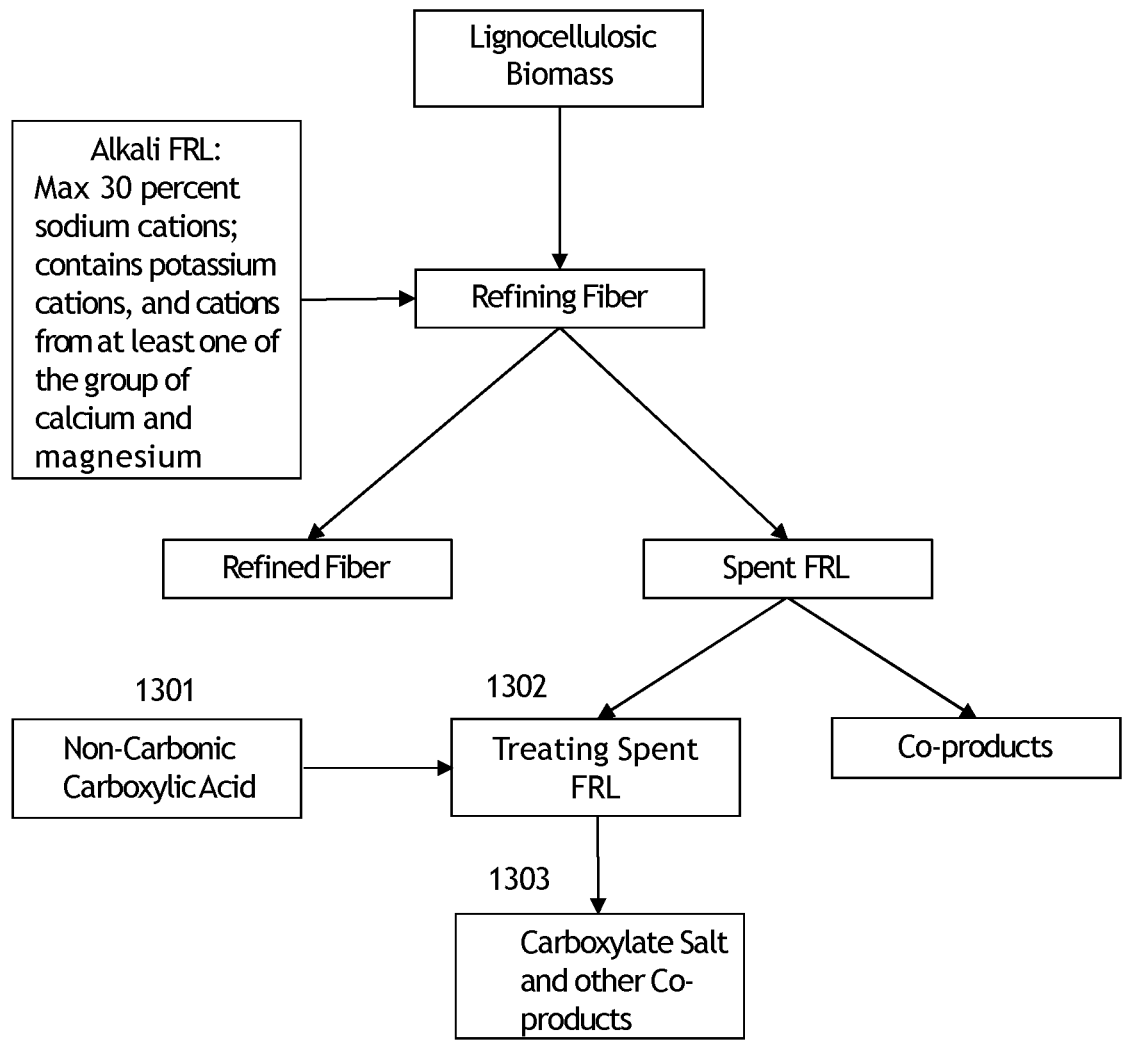

FIG. 13 shows a process as in FIG. 1 wherein spent FRL is treated with non-carbonic carboxylic acid for neutralizing and thereby yielding carboxylate salt and other co-products.

Figure 14:
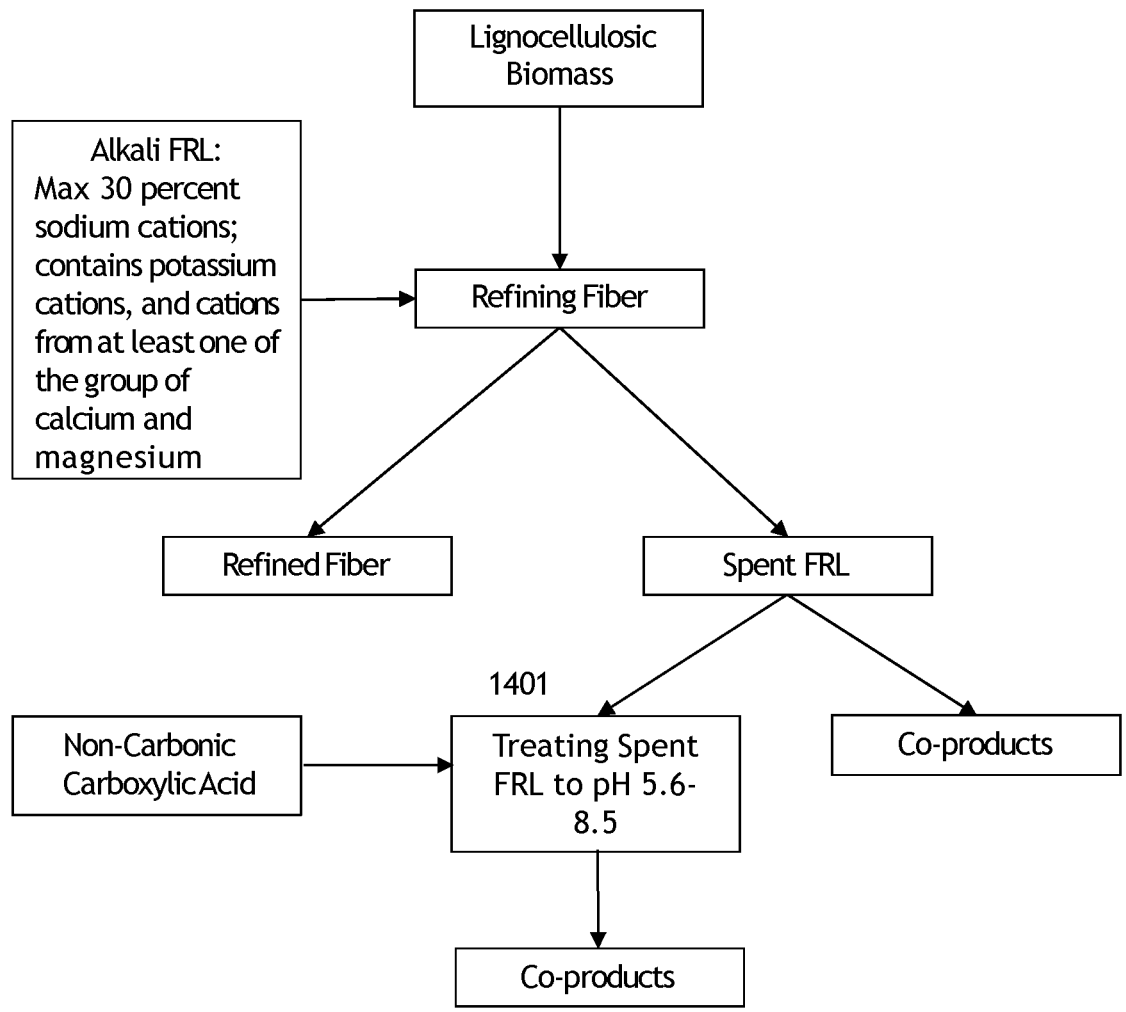

FIG. 14 shows a process as in FIG. 13 wherein the treated spent FRL is neutralized for a pH range between 5.6 and 8.5.

Figure 15:
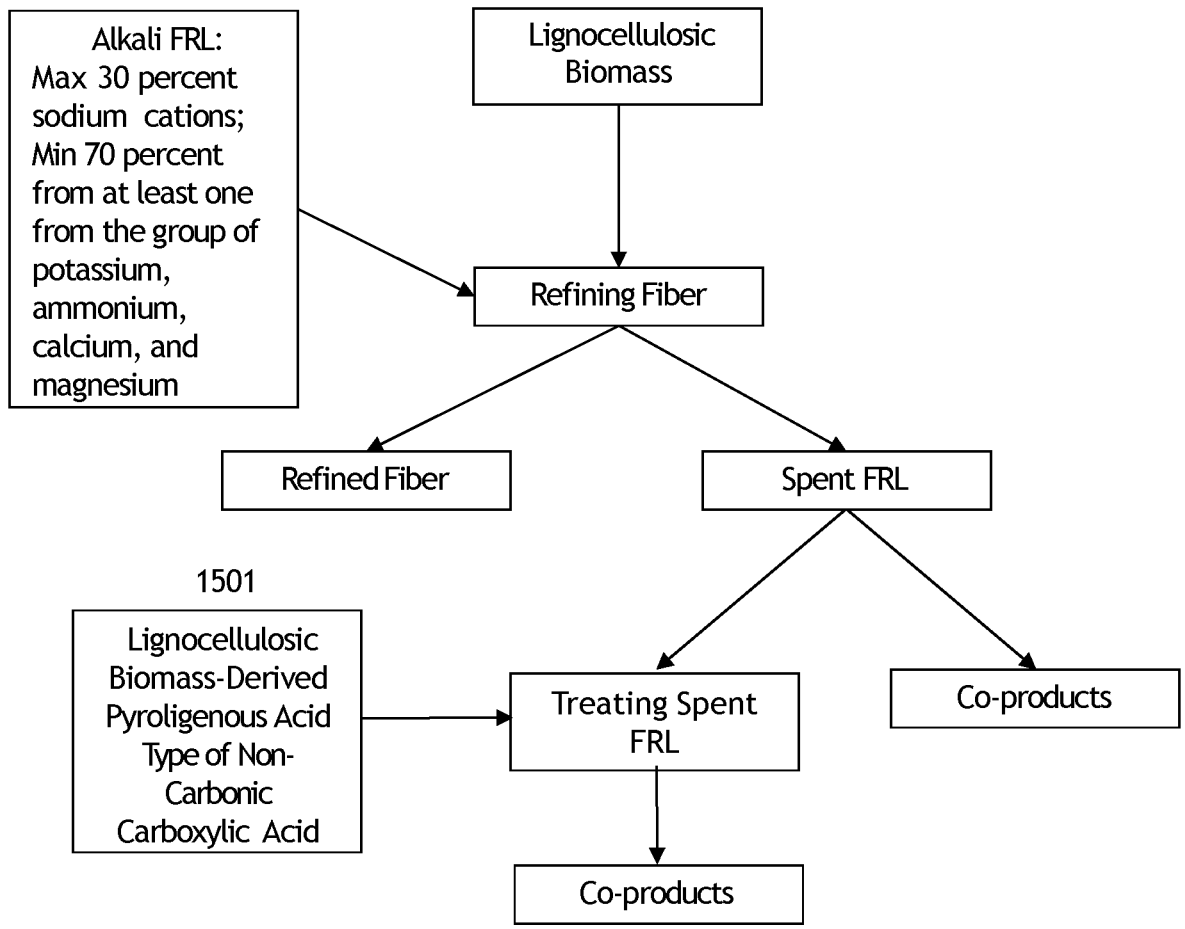

FIG. 15 shows a process as in FIG. 2 wherein the non-carbonic carboxylic acid is derived from pyroligneous acid.

Figure 16:
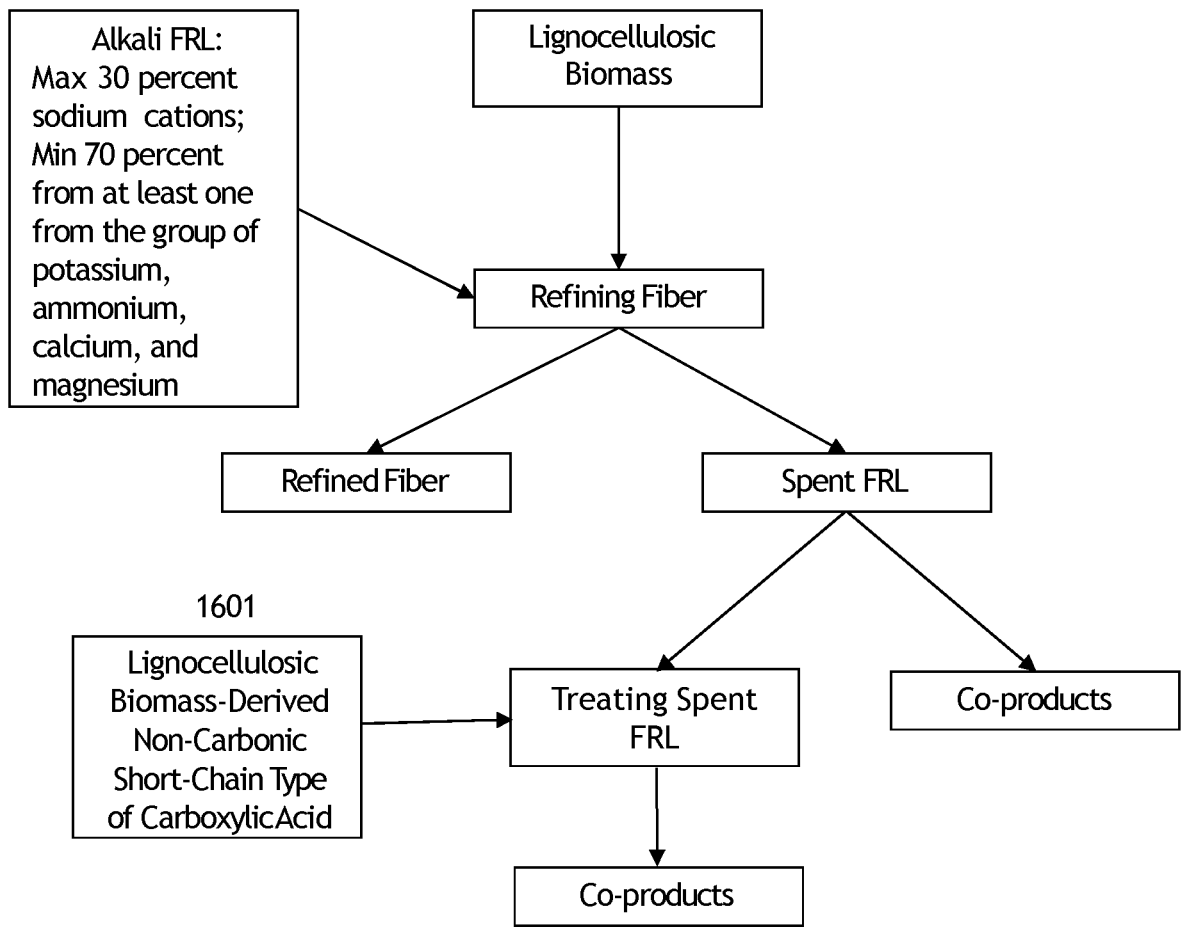

FIG. 16 shows a process as in FIG. 2 wherein spent FRL is treated with biomass-derived, non-carbonic, short-chain carboxylic acid.

Figure 17:
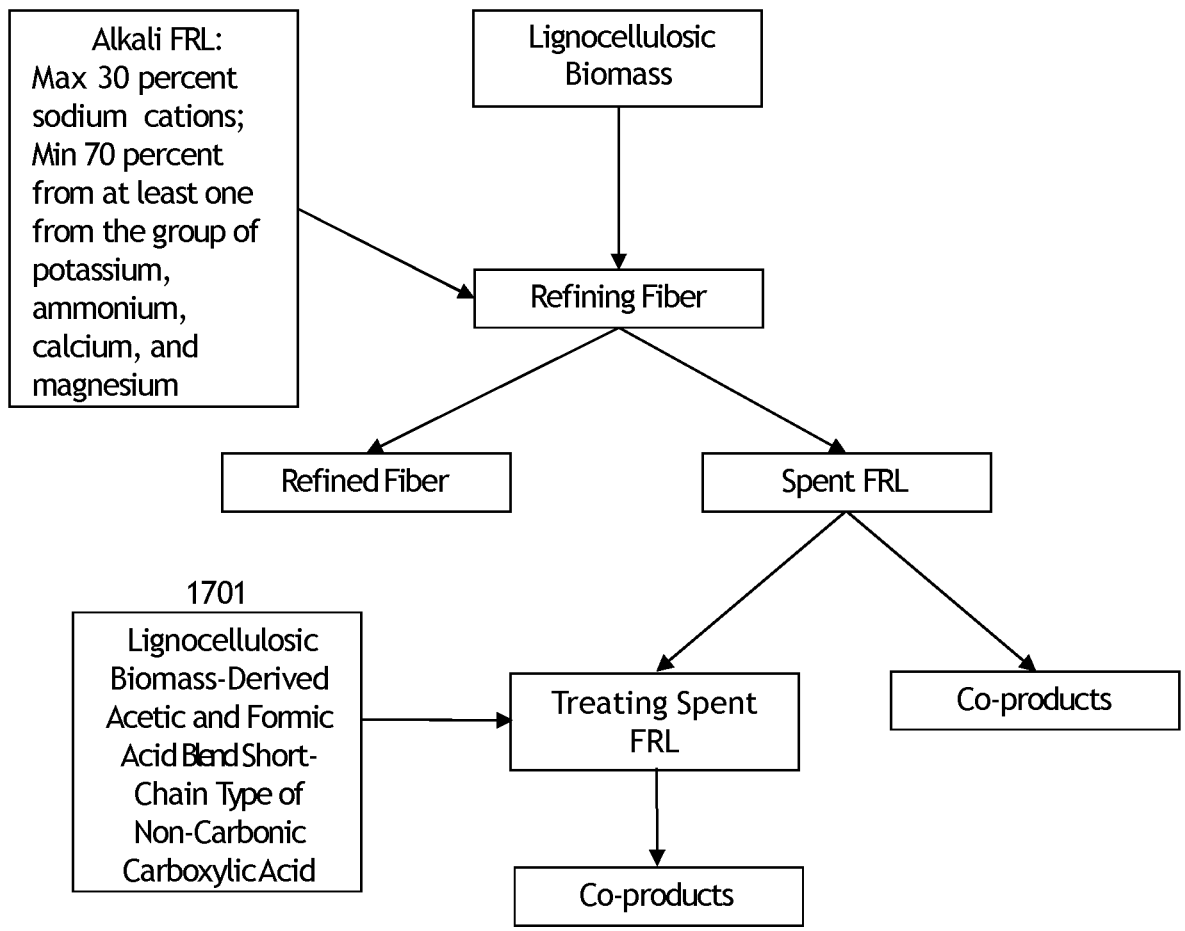

FIG. 17 shows a process as FIG. 16 wherein spent FRL is treated using biomass-derived acetic and formic acid blend, wherein the blend is short-chain non-carbonic carboxylic acid.

Figure 18:
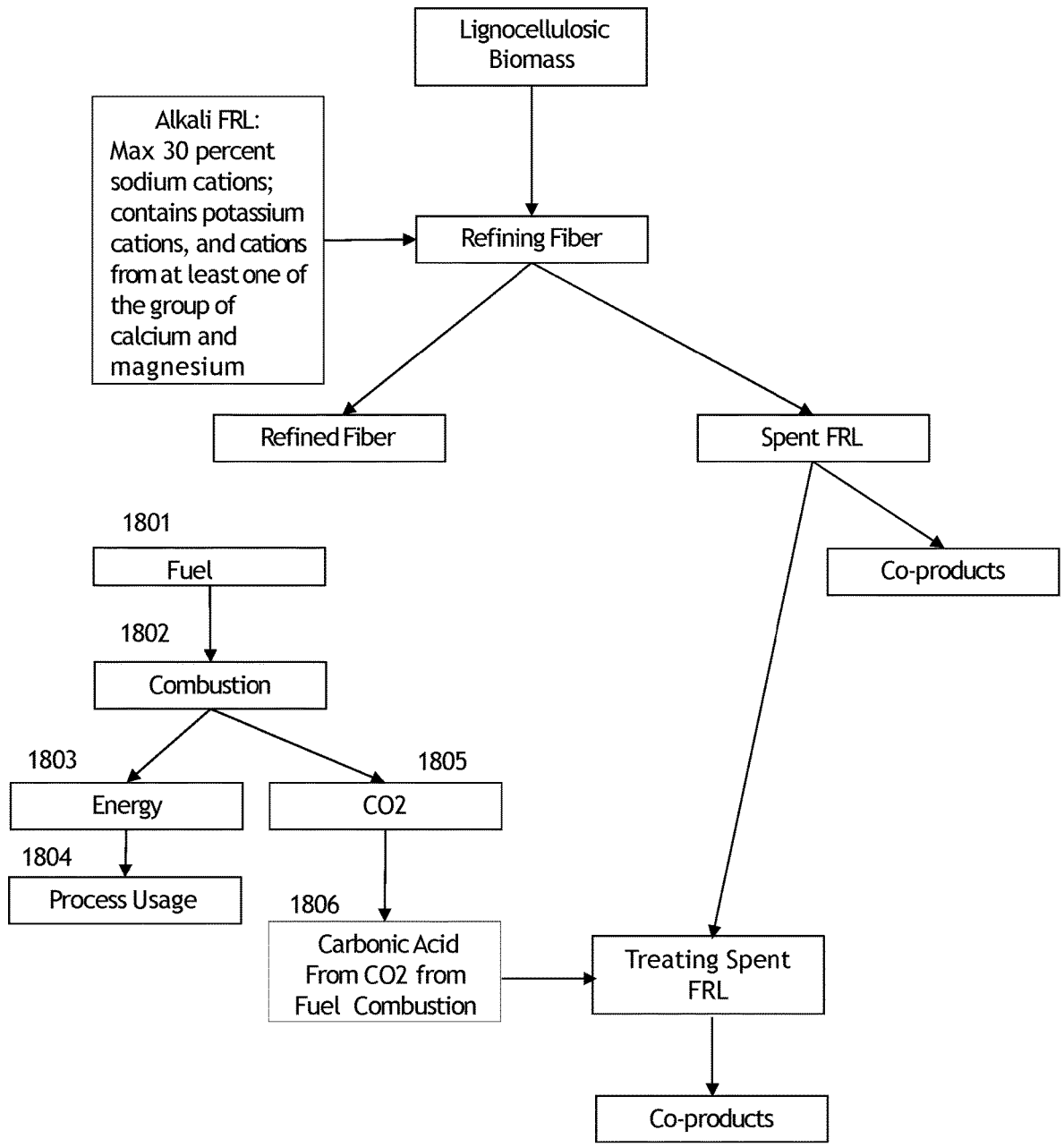
Figure 19:
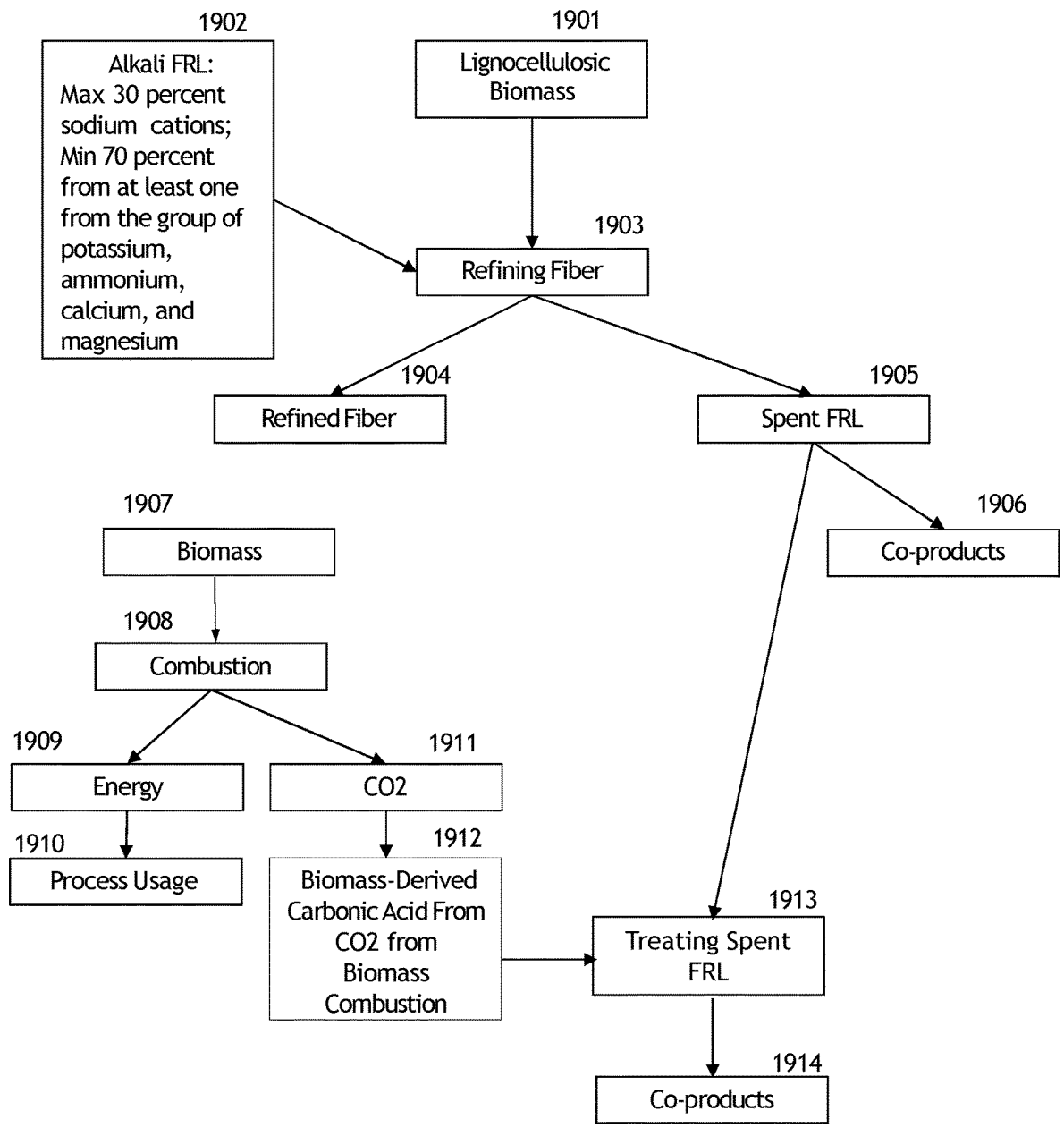

FIG. 18 shows a process as FIG. 1 wherein spent FRL is treated with carbonic acid derived from combustion of a fuel wherein energy and carbon dioxide are produced and wherein the energy can be used for energy-requiring process steps and the carbon dioxide is used to derive said carbonic acid In FIG. 19 a process embodiment is shown wherein the second FRL, as described in FIG. 2, after refining a lignocellulosic biomass, results in a spent FRL which is treated with carbonic acid derived from combustion of biomass, wherein energy and carbon dioxide are produced and wherein the energy can be used for energy-requiring process steps and the carbon dioxide is used to derive said carbonic acid.

Figure 7:
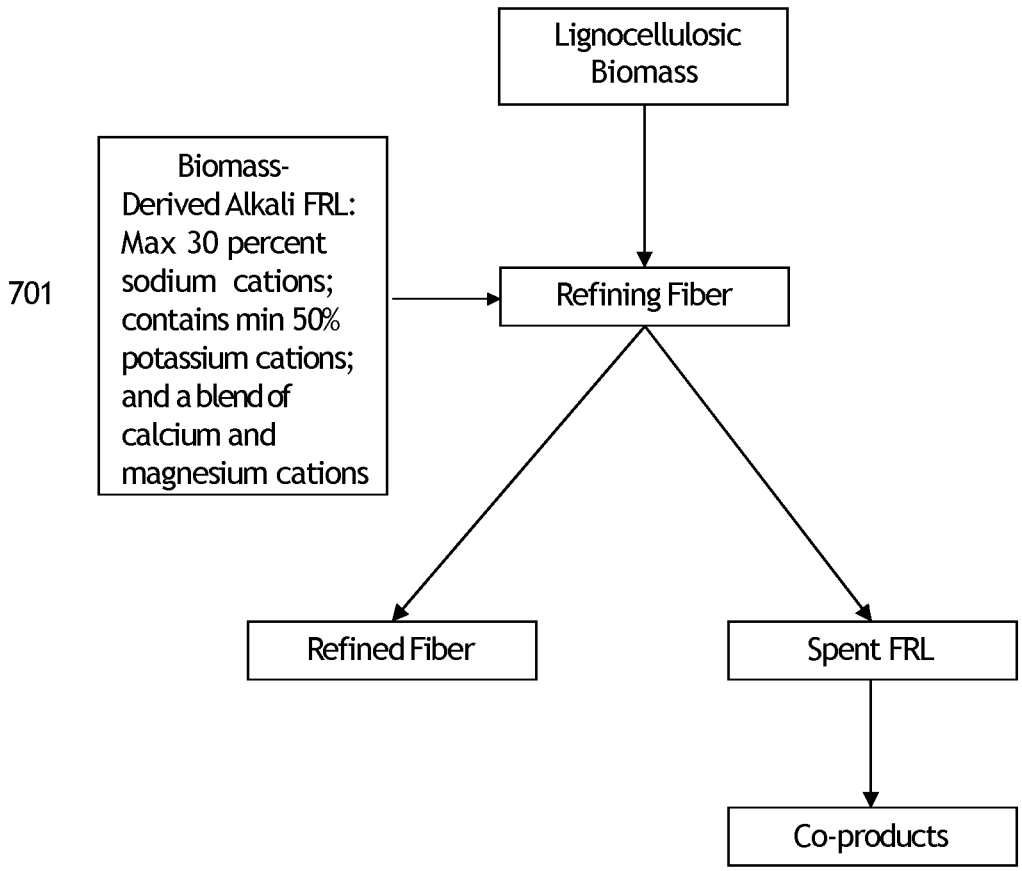
FIG. 7 shows a process as in FIG. 1 wherein the first FRL further comprises biomass-derived alkaline chemicals, with the 30 percent limit on sodium cations, comprising a minimum of 50 percent of potassium and cations from both calcium and magnesium.
Figure 20:
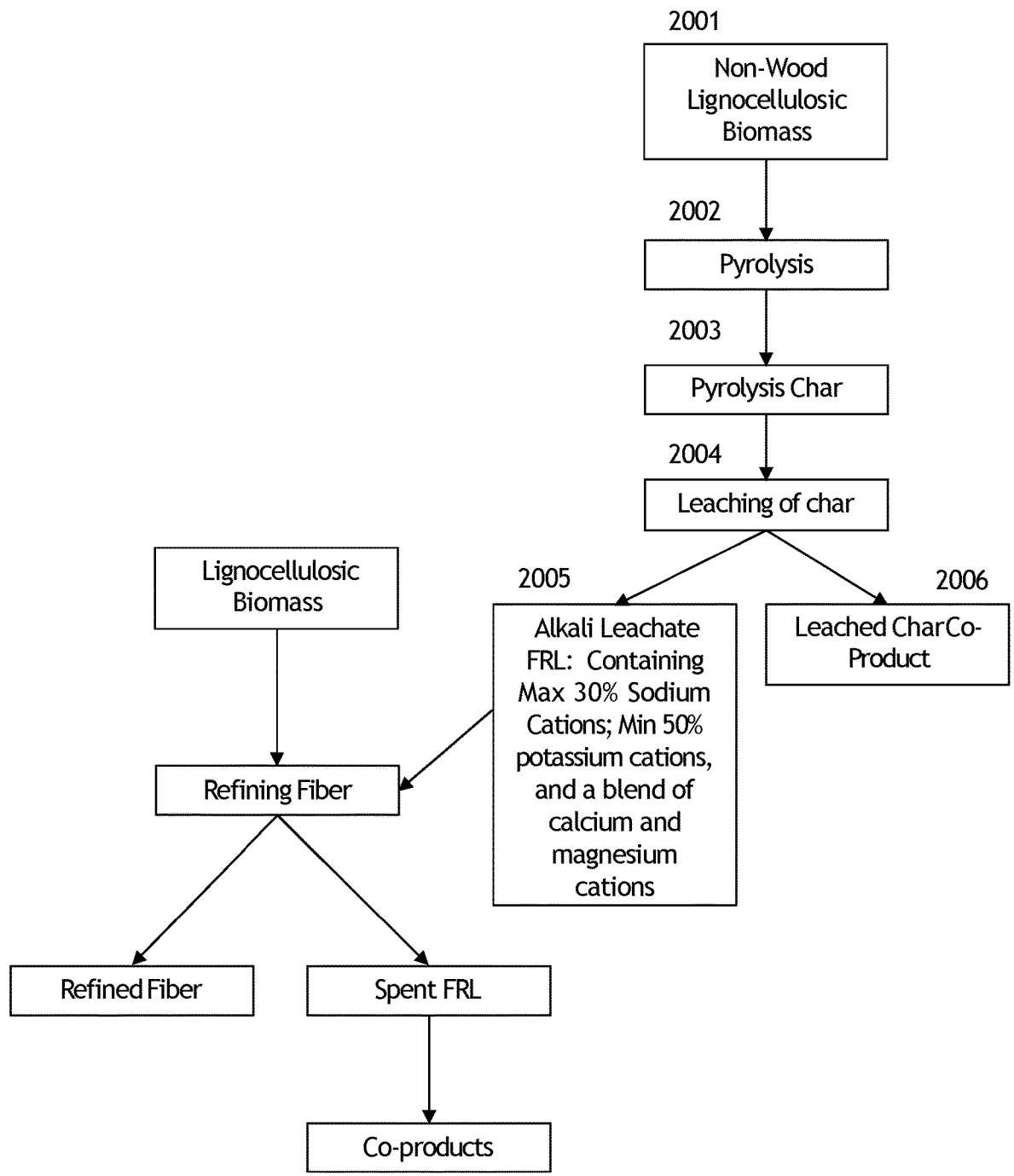

FIG. 20 shows a process as in FIG. 7 wherein alkali leachate is used as the FRL, further limiting the formula of such first FRL to a minimum of 50% potassium cations, and a blend of both calcium and magnesium cations, for refinement of fiber, and the alkali leachate is derived from pyrolysis of non-wood biomass producing pyrolysis char which when leached produces said alkali leachate.

Figure 21:
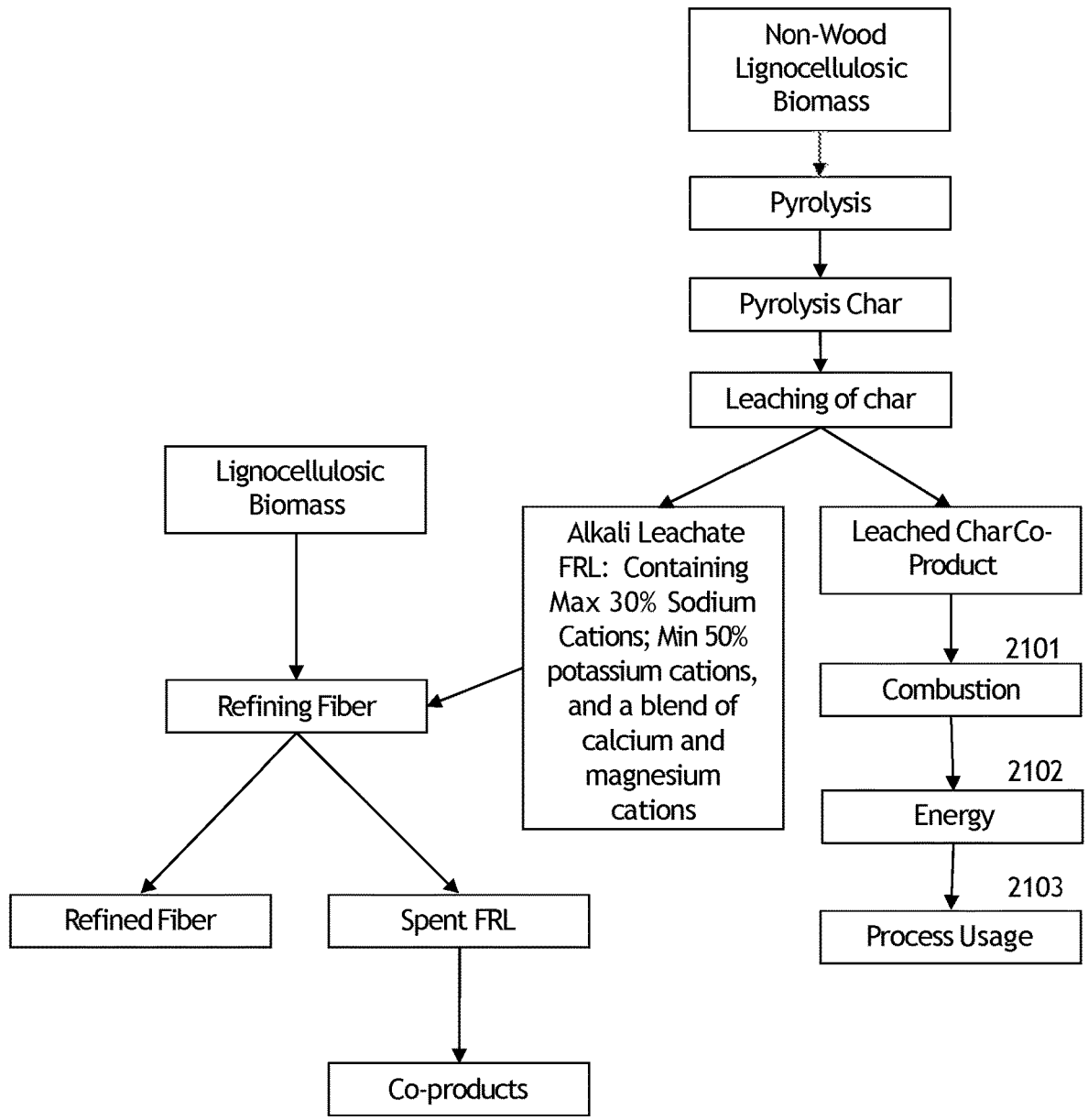

FIG. 21 shows a process as in FIG. 20 wherein leached char co-product is combusted producing heat energy which can be used for energy-requiring process steps.

Figure 22:
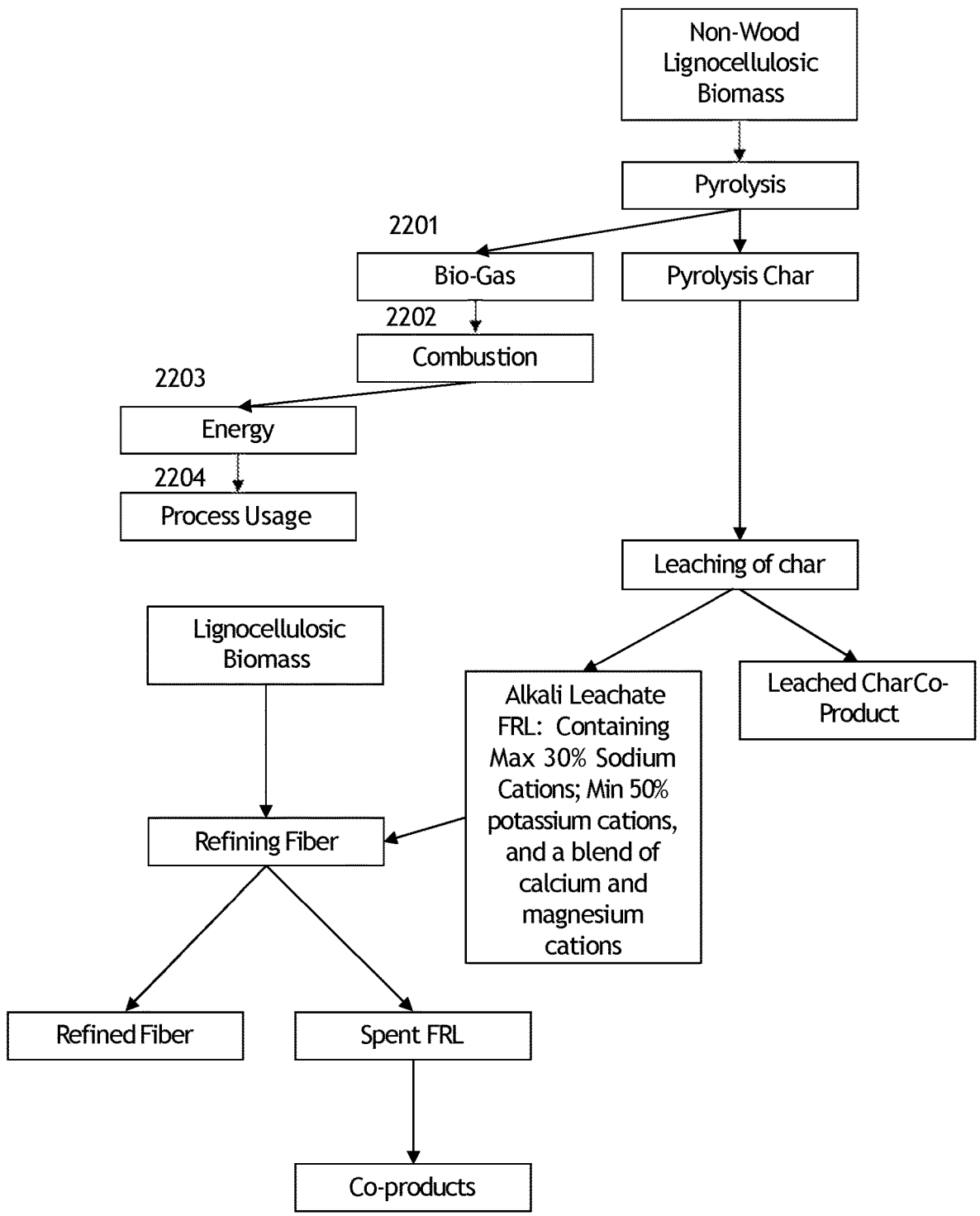

FIG. 22 shows a process as in FIG. 20 wherein a bio-gas co-product produced from pyrolysis of non-wood biomass is combusted producing heat energy for energy-requiring process steps.

Figure 23:
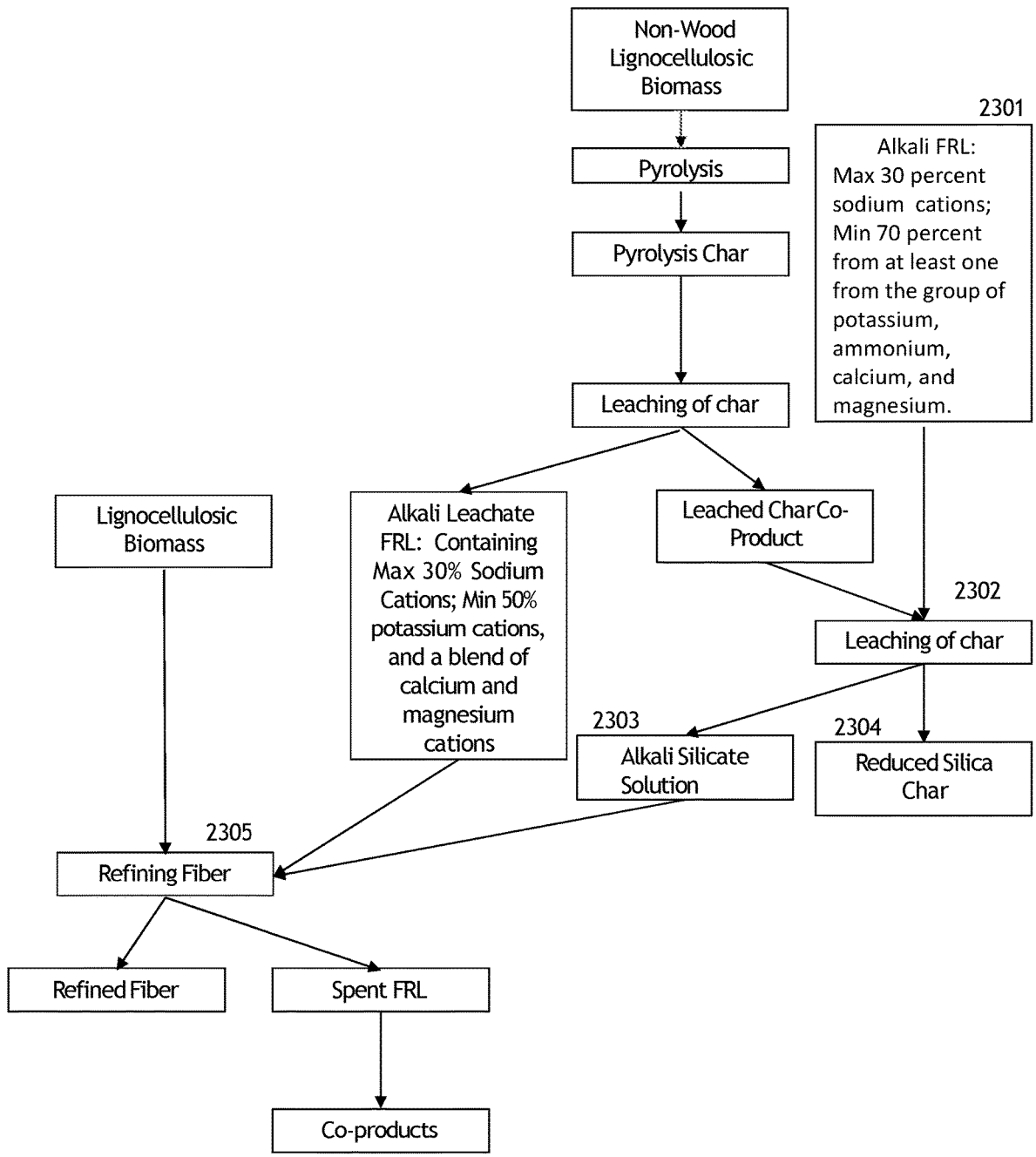
Figure 24:
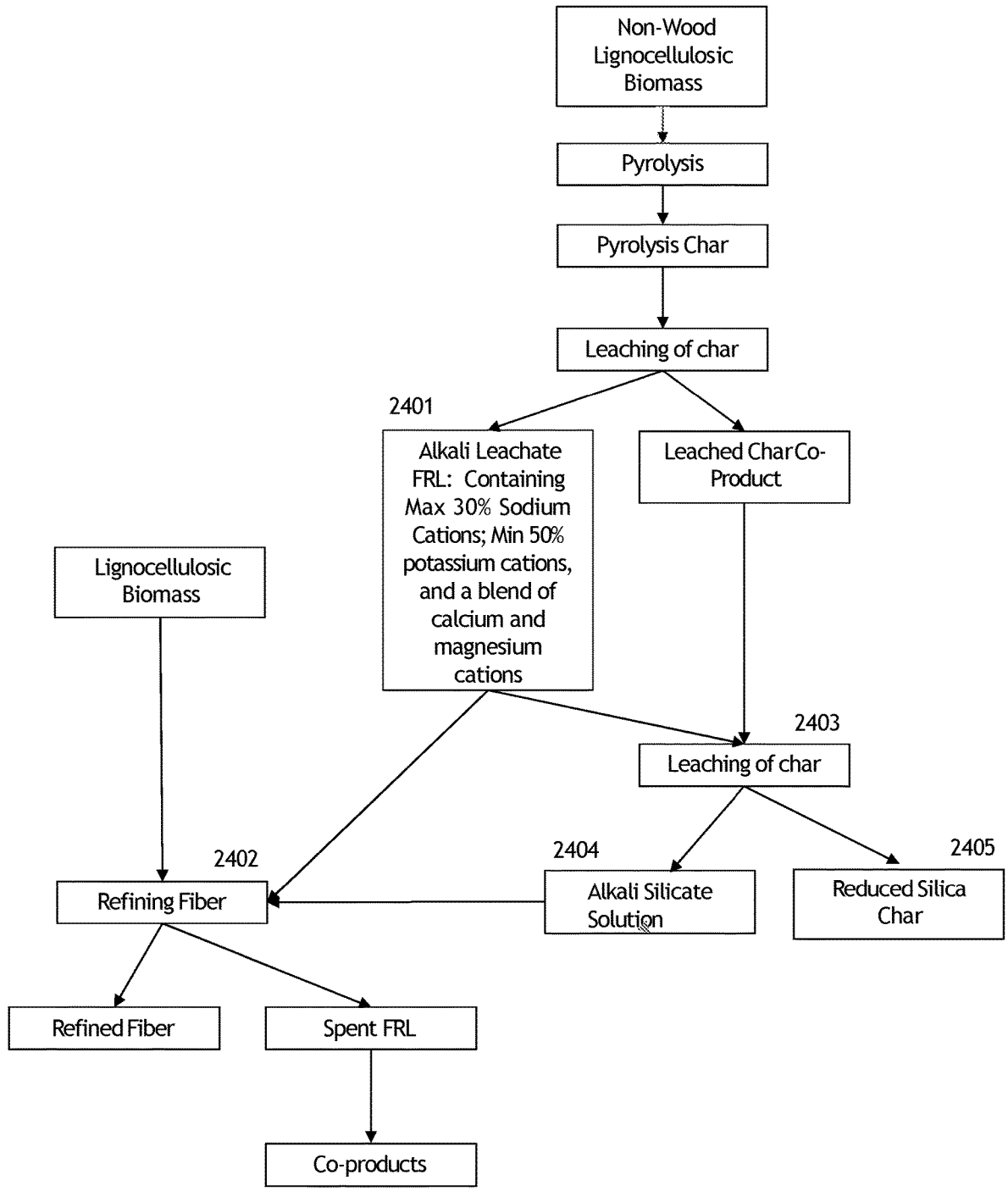

FIG. 23 shows a process as in FIG. 20 wherein the leached char co-product is subject to a second leaching step in which an alkali solution, composed of the second FRL as described in FIG. 2, is used for said second leaching, producing an alkali silicate solution and reduced-silica char co-products, and in which said alkali silicate solution may be used as an additional fiber refining medium FIG. 24 shows a process as in FIG. 20 wherein the alkali leachate is used for fiber refining, and also is used for a second leaching of the leached char co-product, producing an alkali silicate solution and a reduced silica char co-product; and in which said alkali silicate solution may be used as an additional fiber refining medium.

Figure 25:
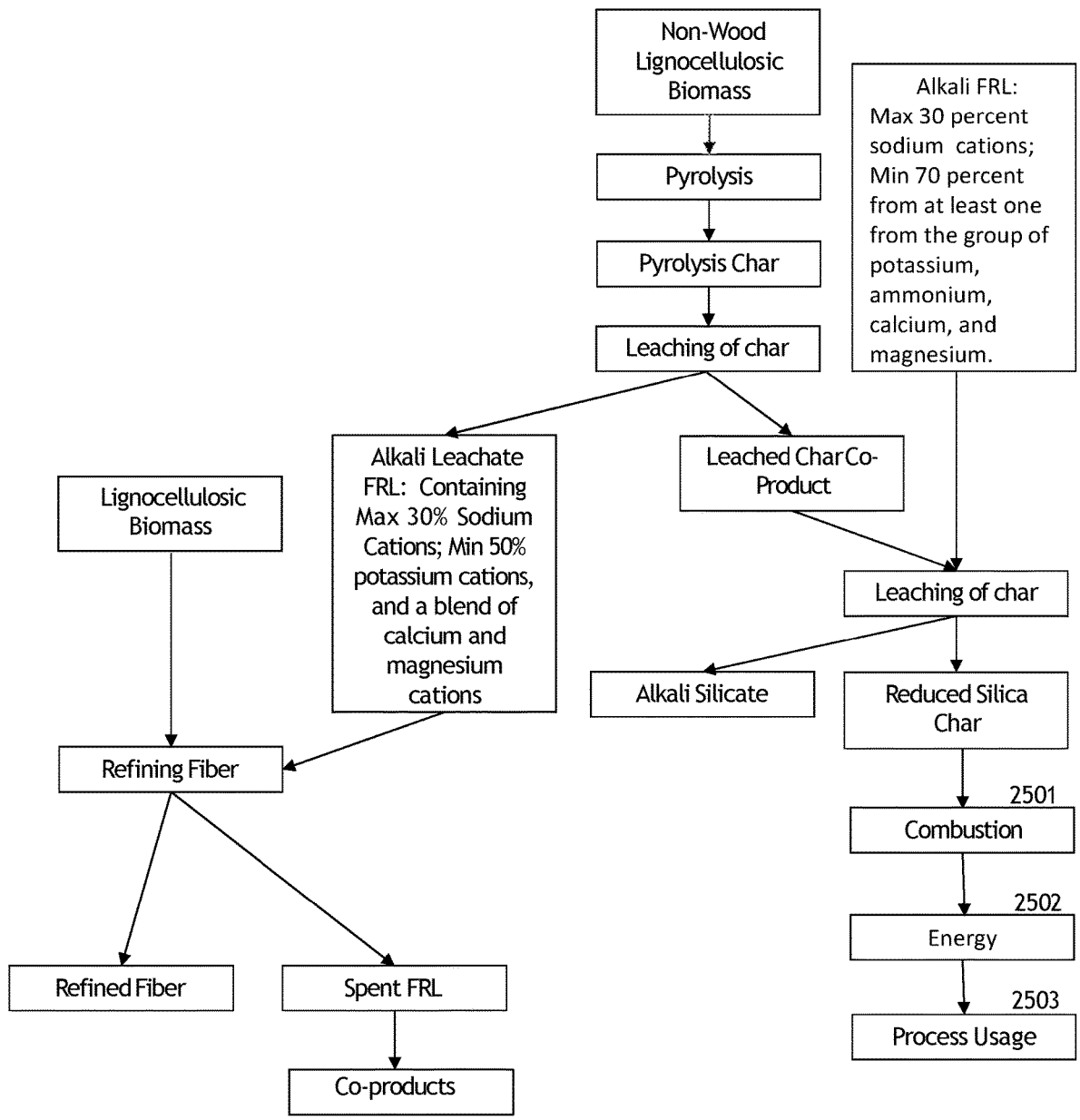

FIG. 25 shows a process as in FIG. 23 wherein reduced-silica char is combusted producing heat energy for energy-requiring process steps.

Figure 26:
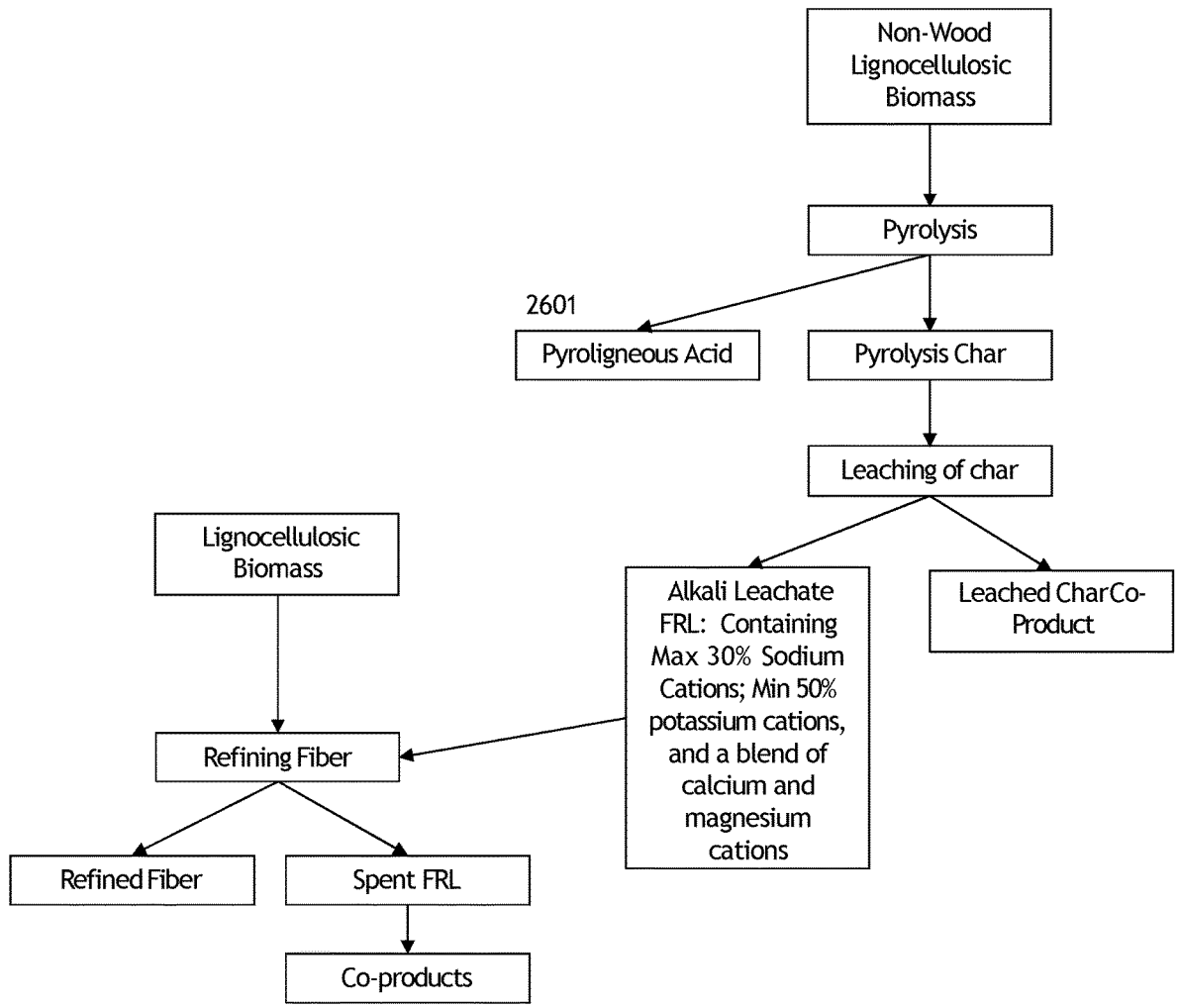

FIG. 26 shows a process as in FIG. 20 wherein pyroligneous acid is derived as a co-product from pyrolysis of non-wood biomass.

Figure 27:
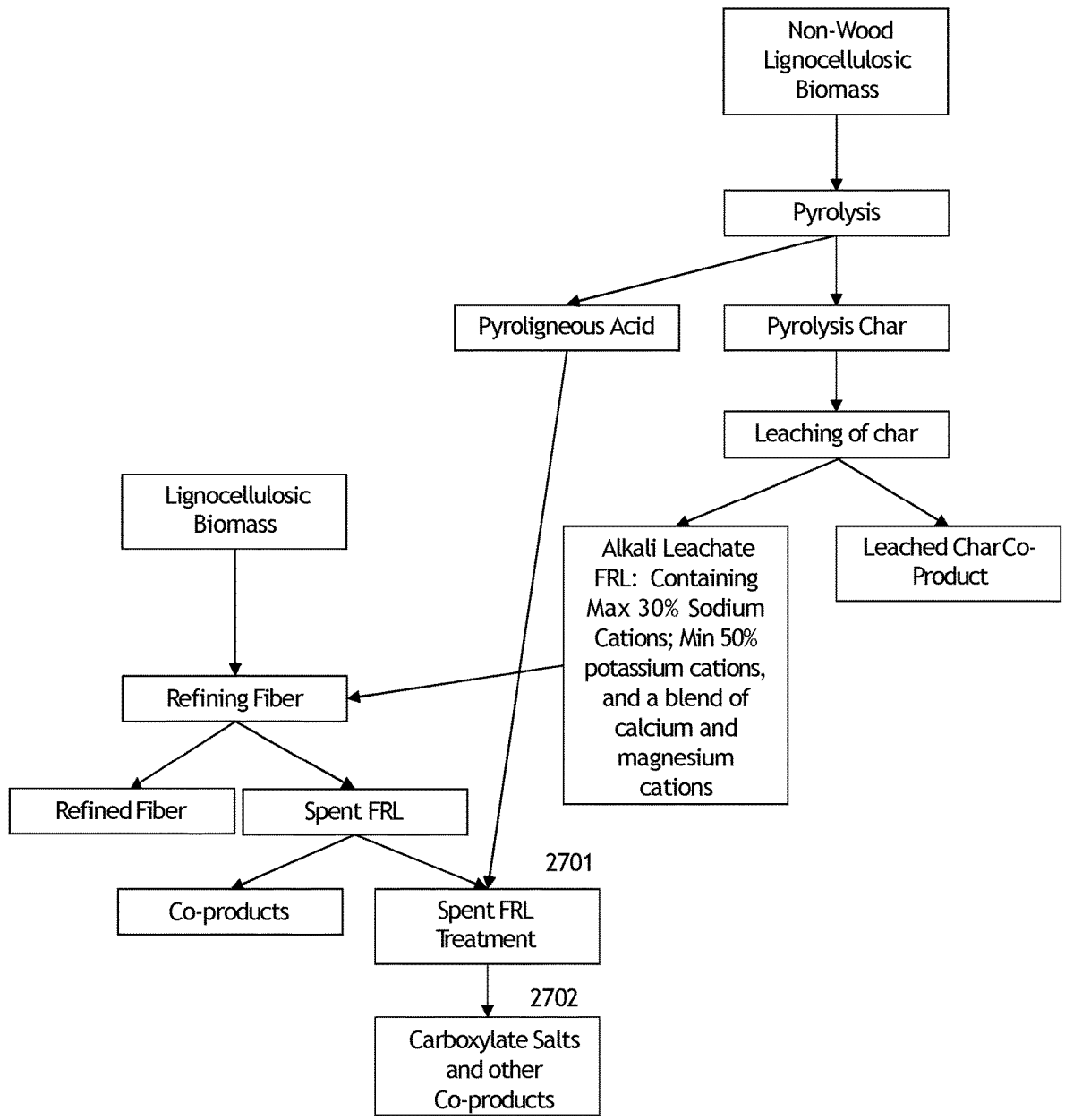

FIG. 27 shows a process as in FIG. 26 wherein the pyroligneous acid is added during a spent FRL treatment resulting in captured carboxylate salts and other co-products.

Figure 28:
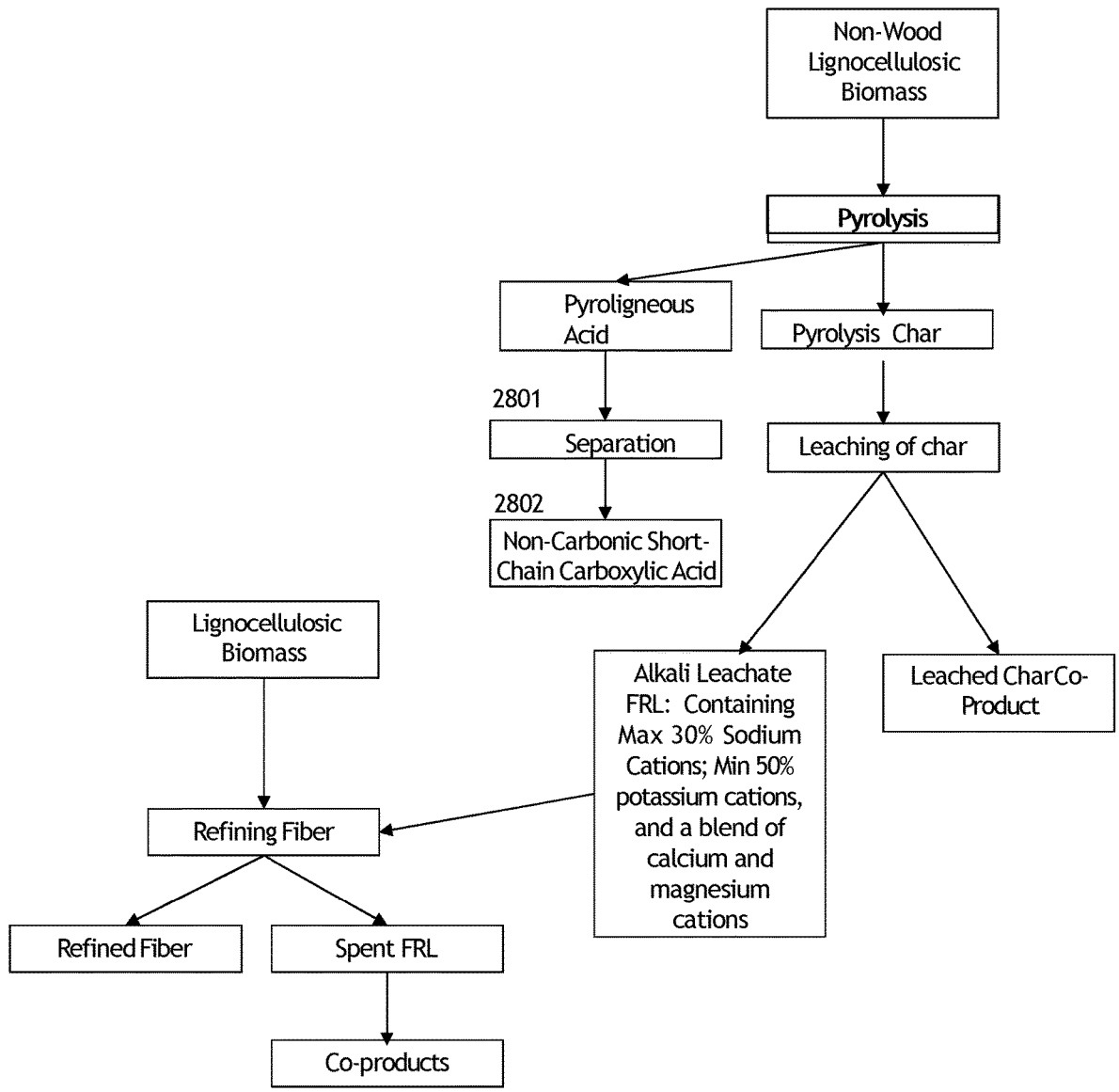

FIG. 28 shows a process as in FIG. 26 wherein pyroligneous acid is separated deriving non-carbonic short-chain carboxylic acid.

Figure 29:
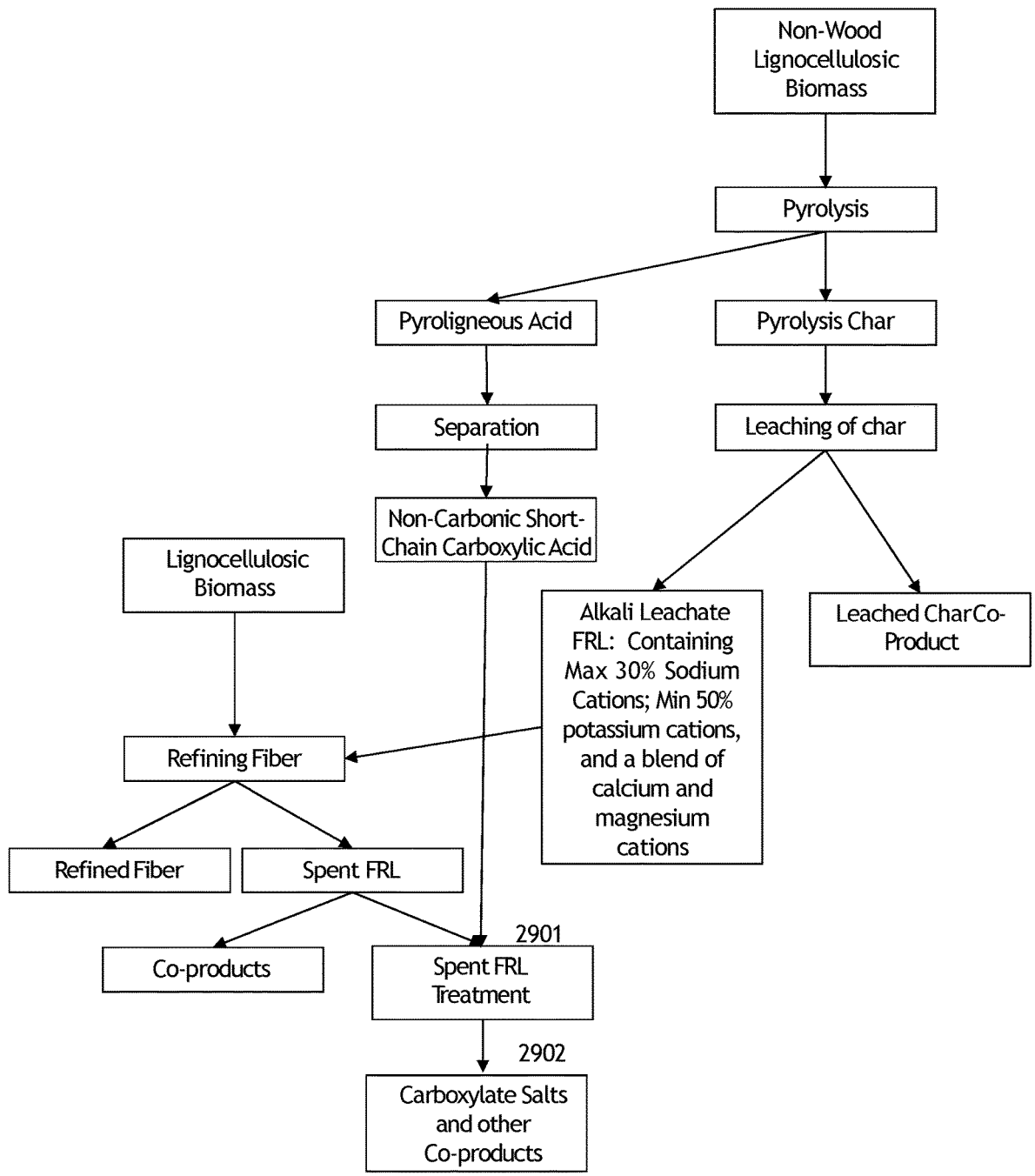

FIG. 29 shows a process as in FIG. 28 wherein the non-carbonic carboxylic acid is adding during a spent FRL treatment resulting in carboxylate salts and other co-products.

Figure 30:
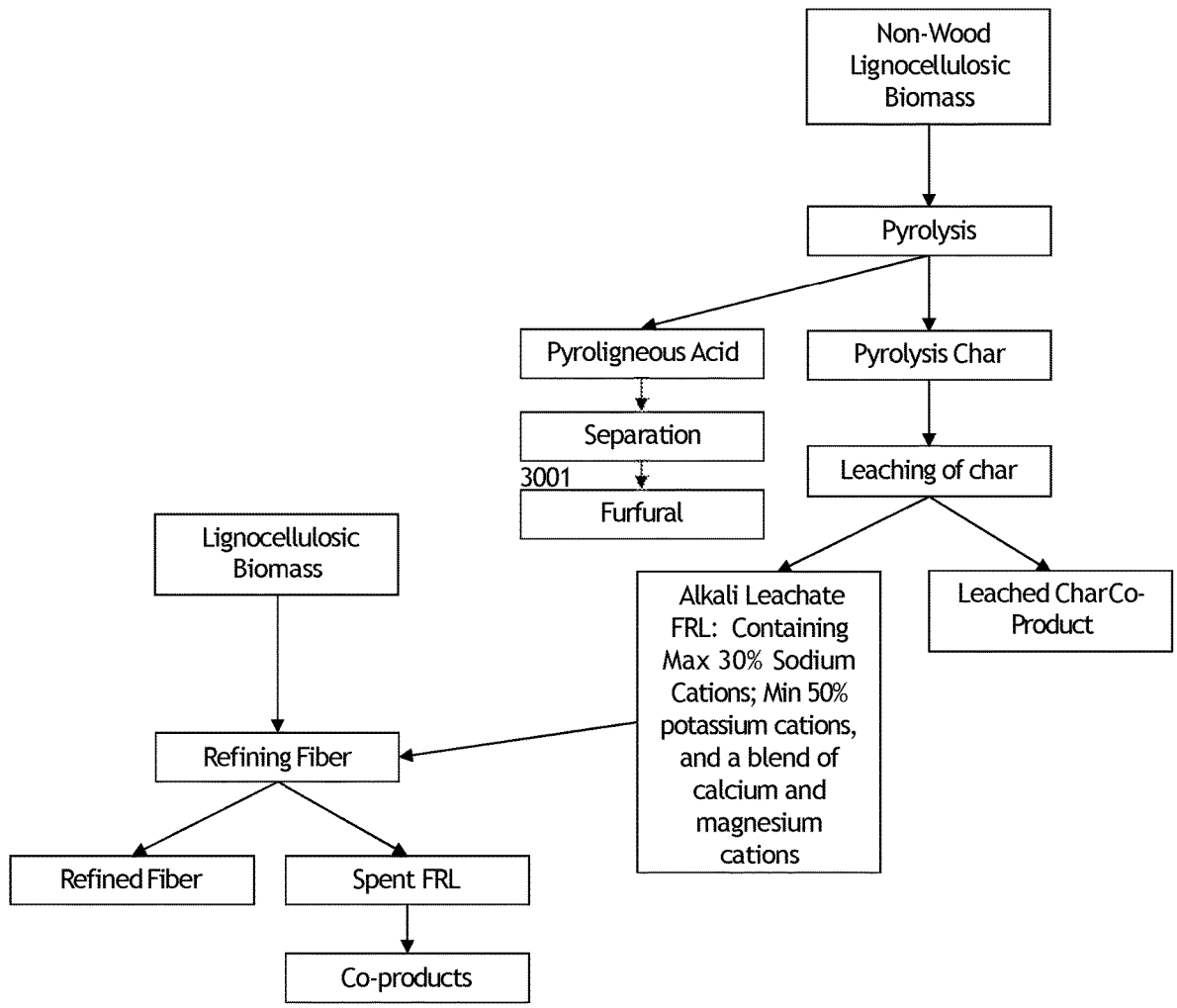

FIG. 30 shows a process as FIG. 26 wherein pyroligneous acid is separated to yield furfural.

Figure 31:
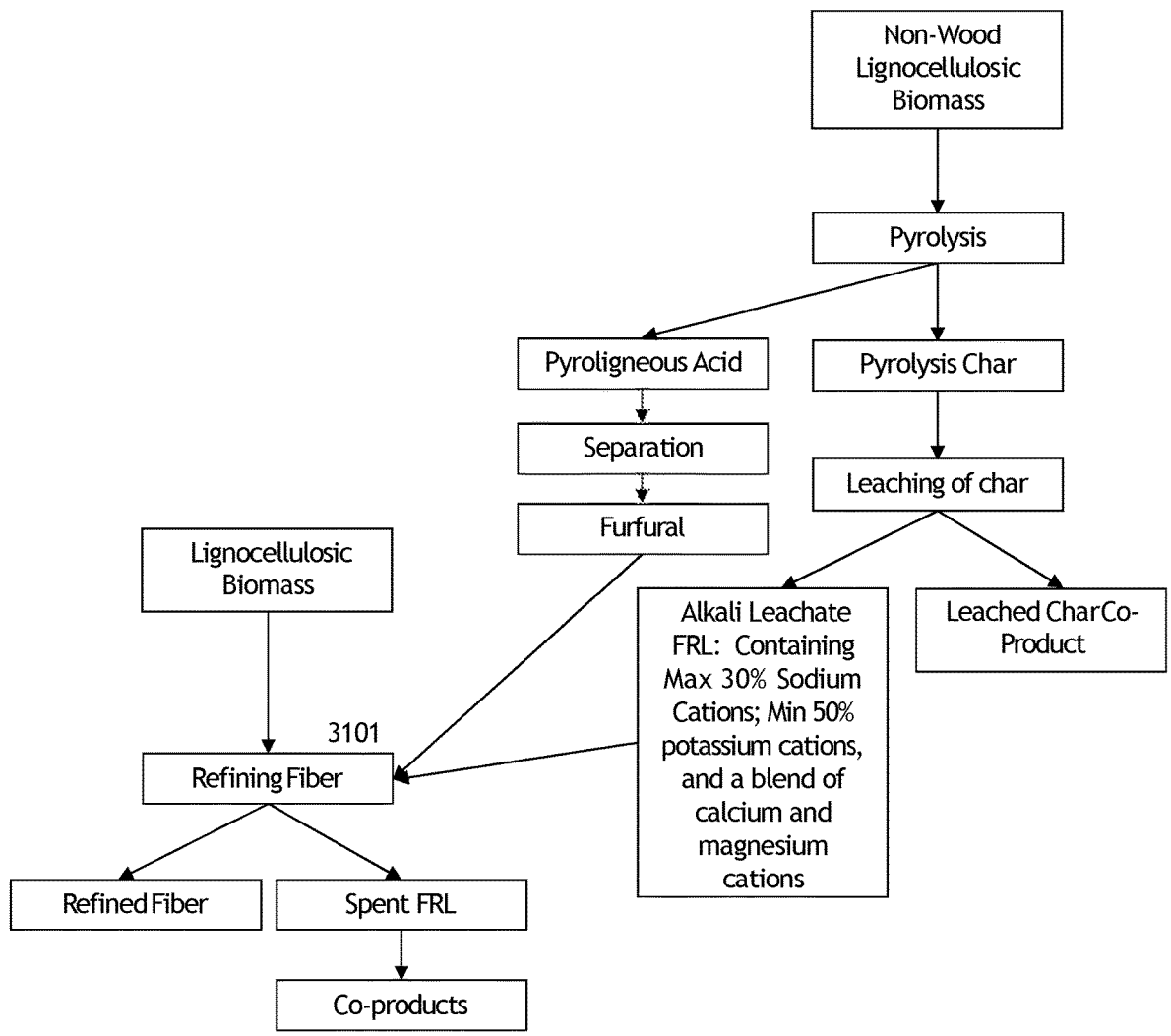

FIG. 31 shows a process as in FIG. 30 wherein furfural is used for fiber refinement.

Figure 32:
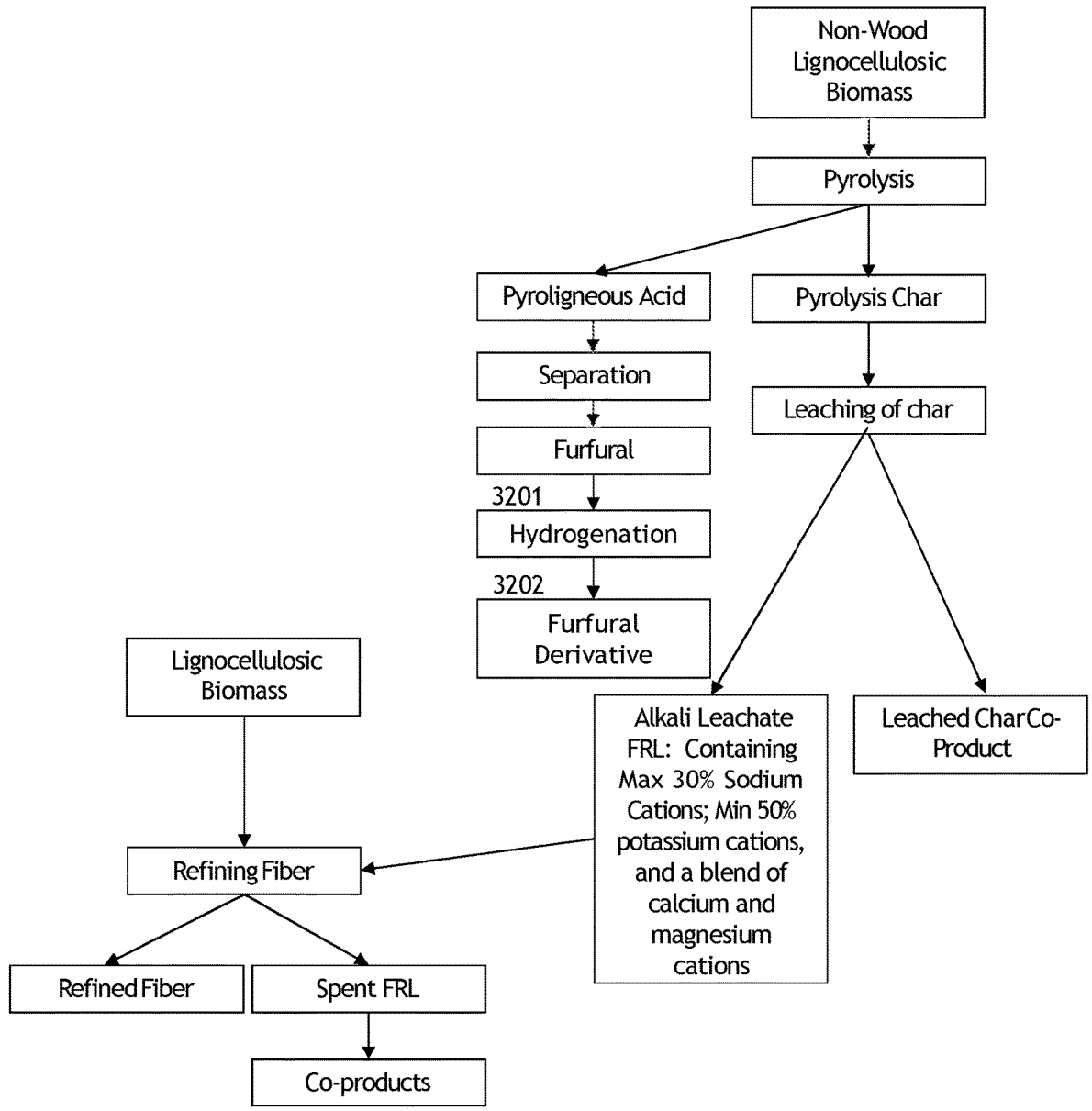

FIG. 32 shows a process as in FIG. 30 wherein furfural is hydrogenated yielding a furfural derivative.

Figure 33:
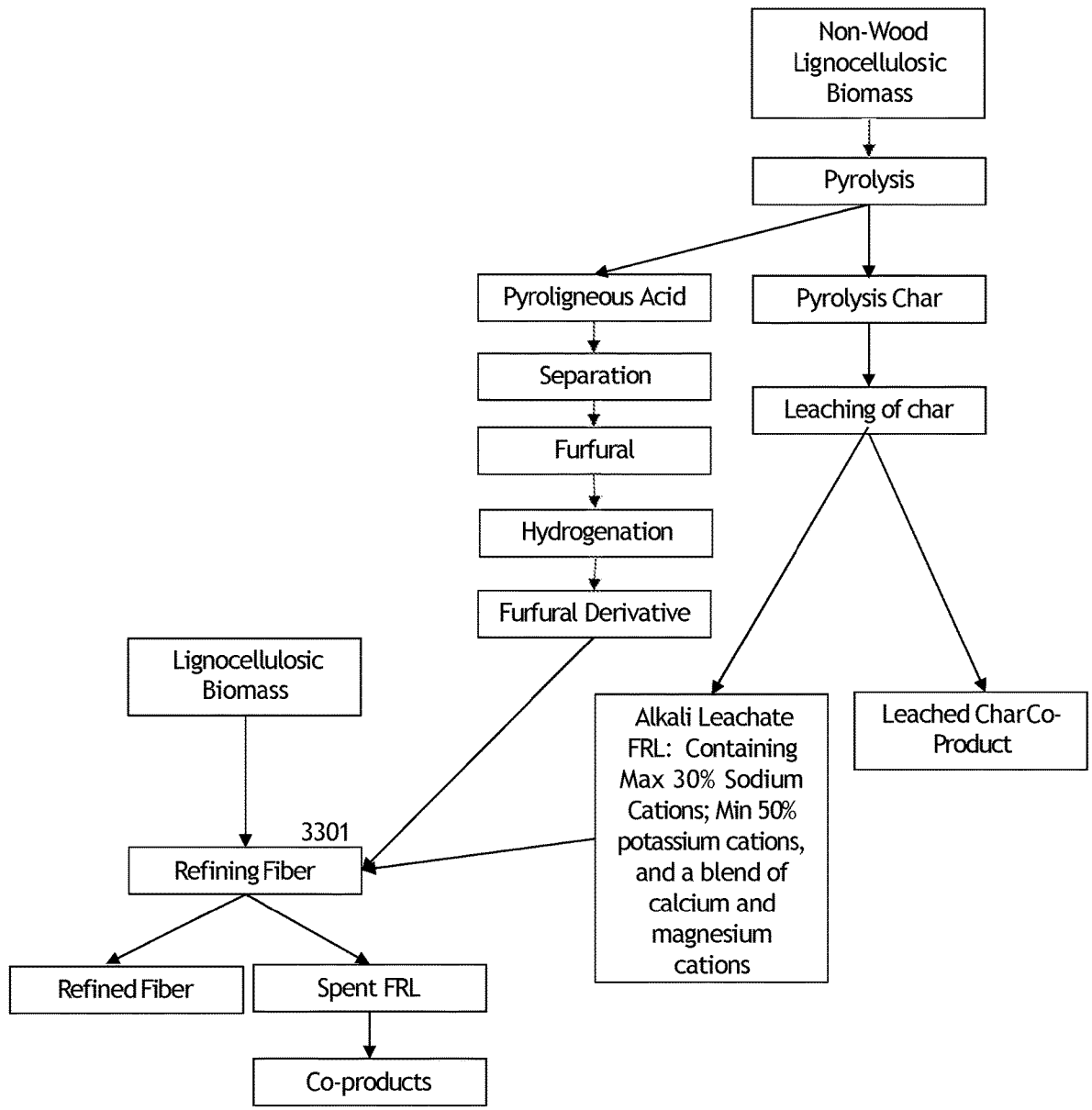

FIG. 33 shows a process as in FIG. 32 wherein furfural derivative is used for refinement of fiber.

Figure 34:
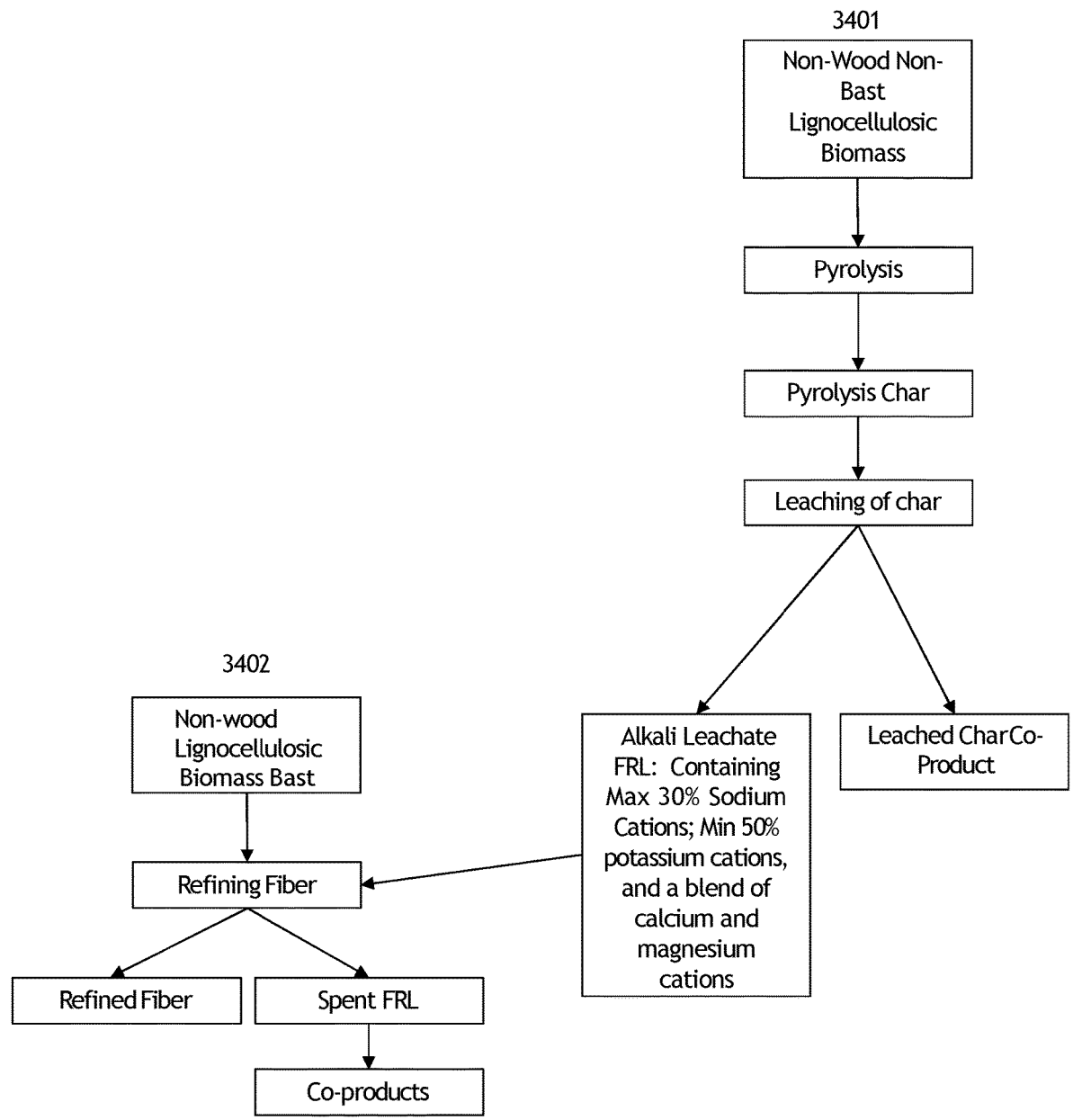

FIG. 34 shows a process as in FIG. 20 wherein non-wood, non-bast lignocellulosic biomass tissue is used for pyrolysis and bast tissue is used as the source of fiber for fiber refinement.

Figure 35:
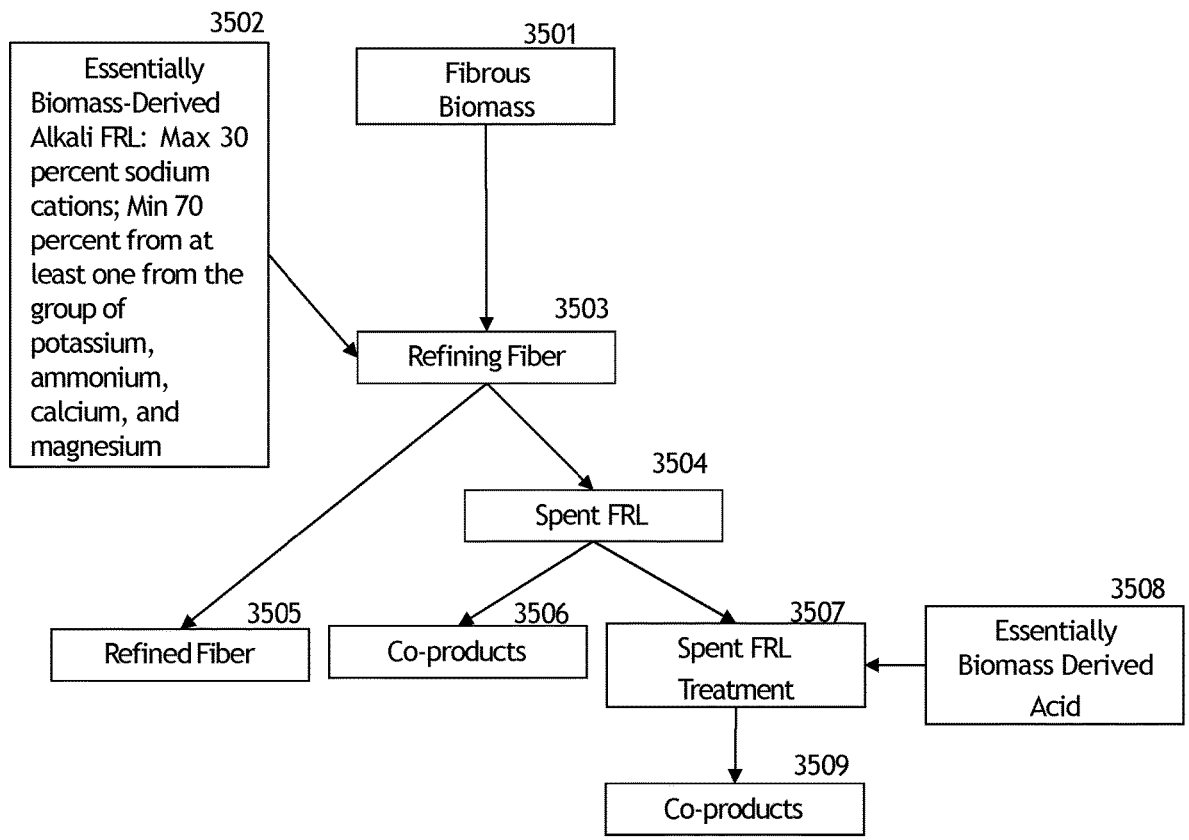

FIG. 35 shows a process embodiment wherein the raw material is fibrous biomass, and the alkaline FRL is essentially biomass derived according to the limitations of the second FRL described in FIG. 2. In treating spent FRL, an essentially biomass-derived acid is used.

Figure 36:
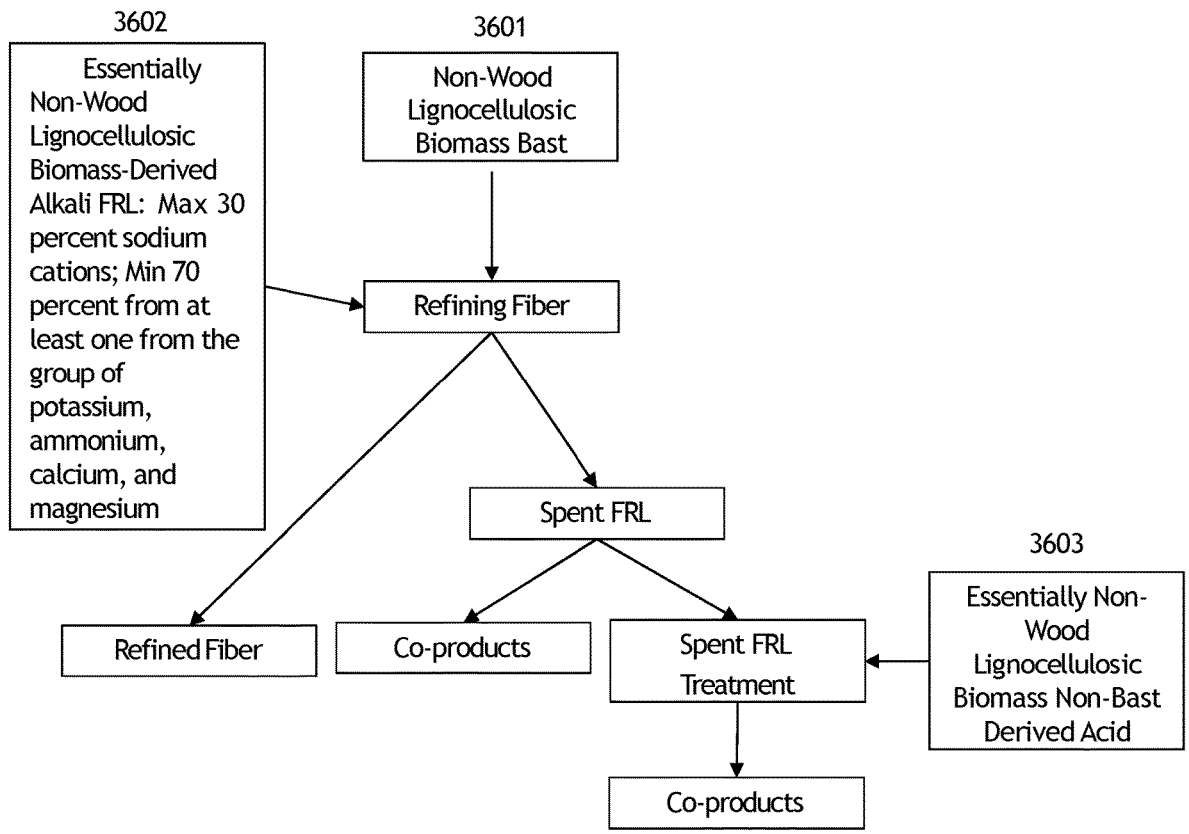

FIG. 36 shows a process as in FIG. 35 wherein alkali FRL is essentially derived from non-wood non-bast lignocellulosic biomass tissue; spent FRL chemicals are essentially derived from non-wood non-bast lignocellulosic biomass tissue; and fiber for refinement is sourced from non-wood bast lignocellulosic biomass tissue.

Figure 37:
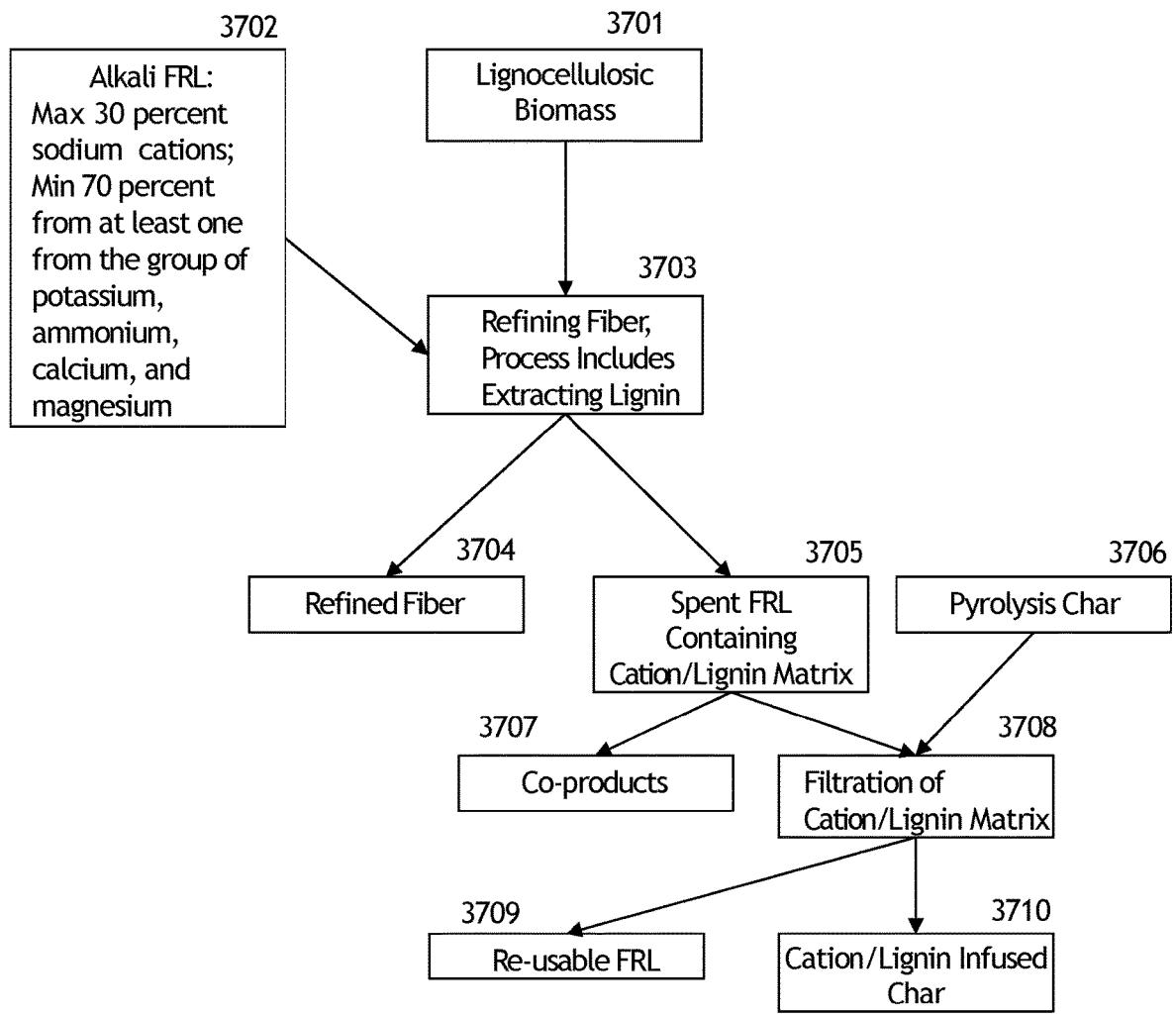

FIG. 37 shows an embodiment of the process, beginning with lignocellulosic biomass, refining said biomass with an alkaline FRL comprising a maximum of 30 percent sodium cations, and the balance of alkali cations essentially comprising cations from the group potassium, calcium, magnesium, and ammonium; wherein the fiber refining process includes the extraction of lignin; resulting in refined fiber and a spent FRL containing a cation/lignin matrix yielding co-products. In addition, the spent FRL may be filtered to remove cation/lignin matrix using pyrolysis char as the filter medium, thus yielding cation/lignin infused char and treated FRL solution which may be reused for fiber refinement.

Figure 38:
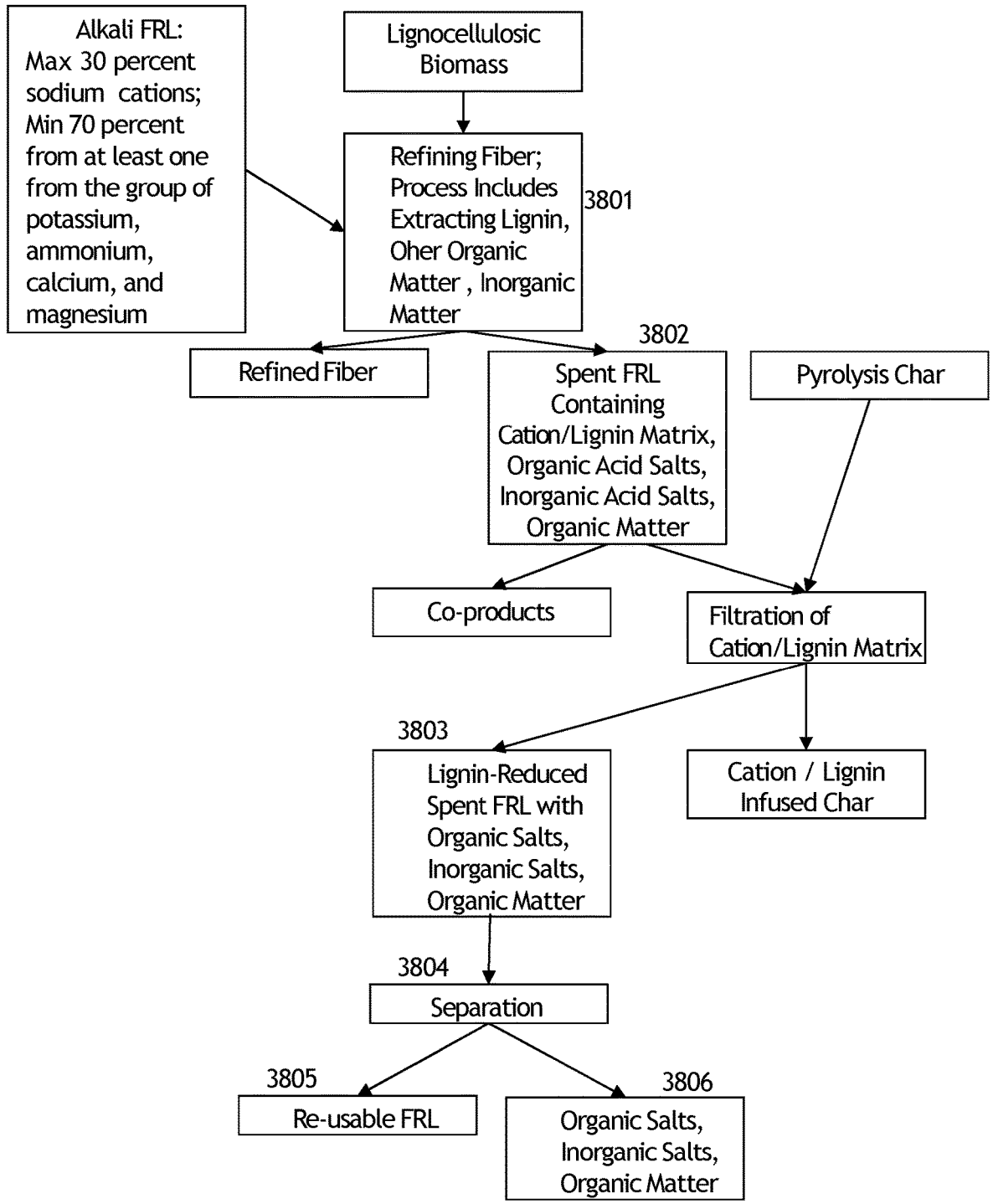

FIG. 38 shows a process as in FIG. 37 wherein the fiber refining process includes the extraction of lignin, other organic matter, and minerals; and the spent FRL comprises a cation/lignin matrix, organic and inorganic acid salts and organic matter yielding co-products. The spent FRL may be treated by filtering using pyrolysis char as the filter medium yielding cation/lignin infused char plus spent FRL with organic acid salts, inorganic salts and organic matter. This treated spent FRL may be physically separated to yield a treated spent FRL which may be reused for fiber refinement, and co-products comprising organic and inorganic salts and organic matter.

Figure 39:
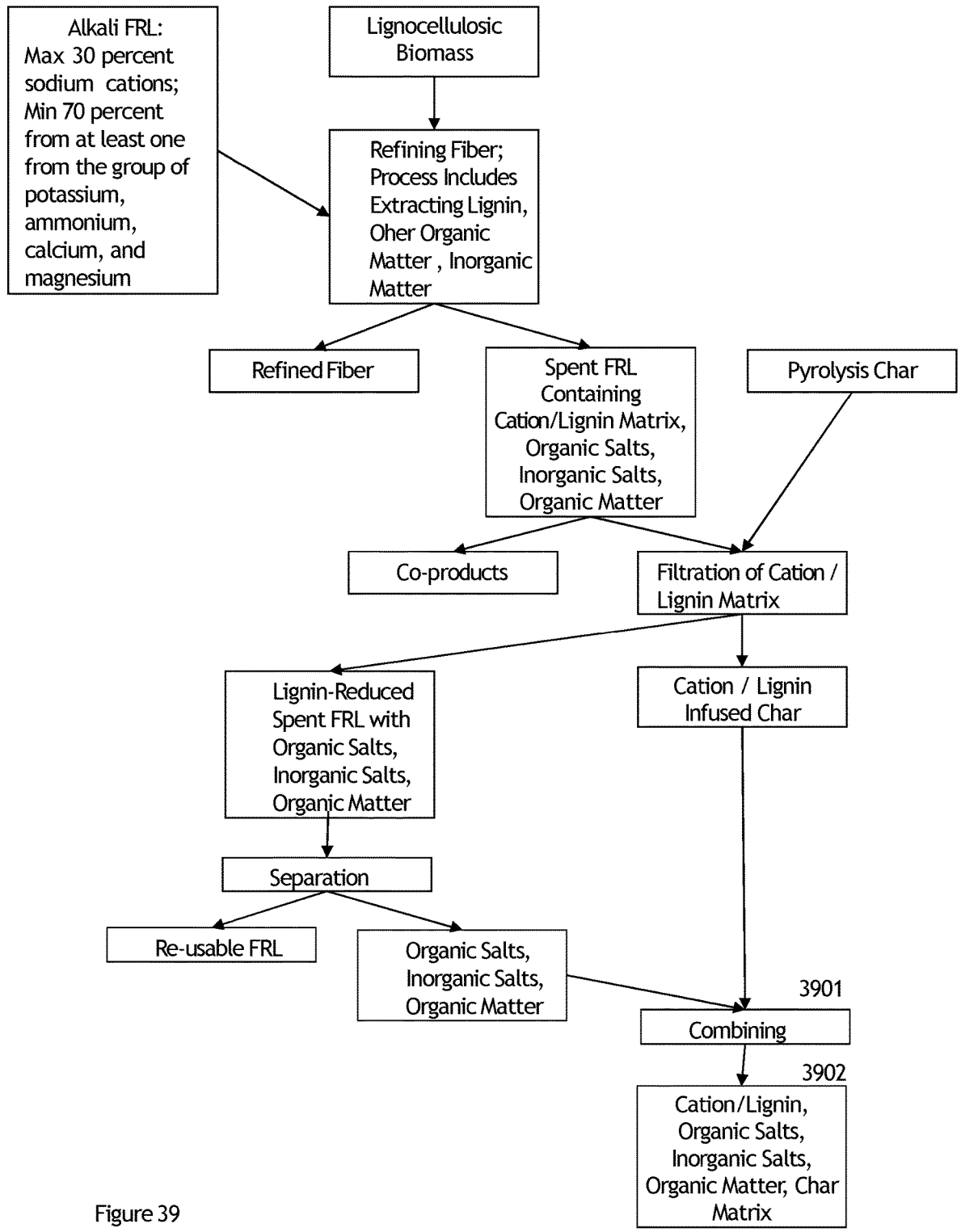

FIG. 39 shows a process as in FIG. 38 wherein the organic and inorganic salts and organic matter co-products are combined with cation/lignin infused char yielding a cation/lignin, organic salt, inorganic salts, and organic matter and char matrix.

Figure 40:
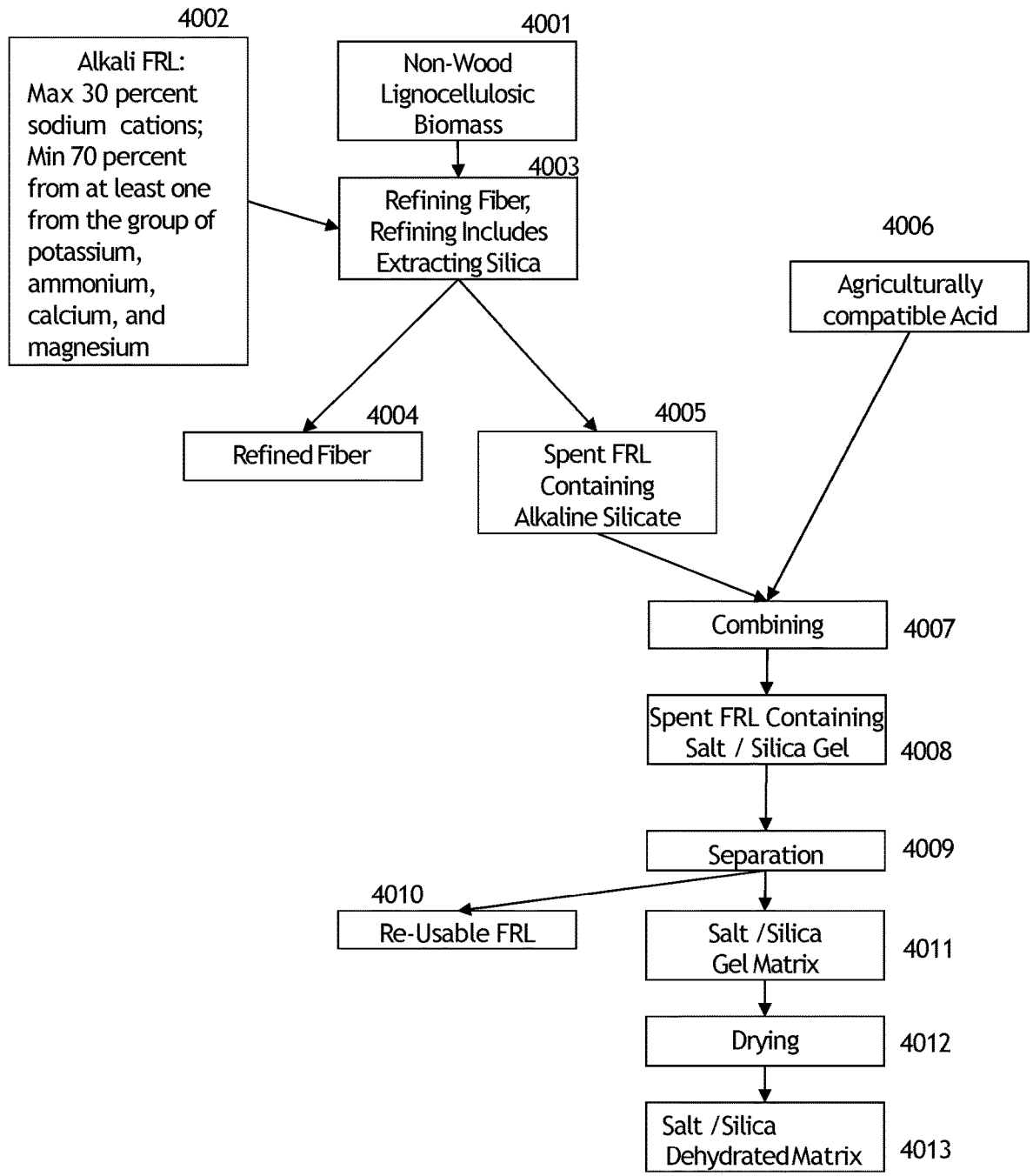

FIG. 40 shows an embodiment of the process beginning with non-wood lignocellulosic biomass, refining said biomass with an alkaline FRL comprising a maximum of 30 percent sodium cations, and the balance of alkali cations essentially composed of cations from the group including potassium, calcium, magnesium, and ammonium, wherein the fiber refining process includes the extraction of silica, resulting in refined fiber and a spent FRL containing alkaline silicate; and treating said spent FRL by combining with acid essentially from the group including carboxylic acid, phosphoric acid, nitric acid, sulfuric acid in such a way to forming salts and a silica gel within the treated spent FRL; and in which the components of such a treated spent FRL may additionally be separation from solution to create a reusable FRL solution and a salt/silica gel matrix; and in which the salt/silica gel matrix may additionally be dried to form a dehydrated salt/silica gel matrix.

Figure 41:
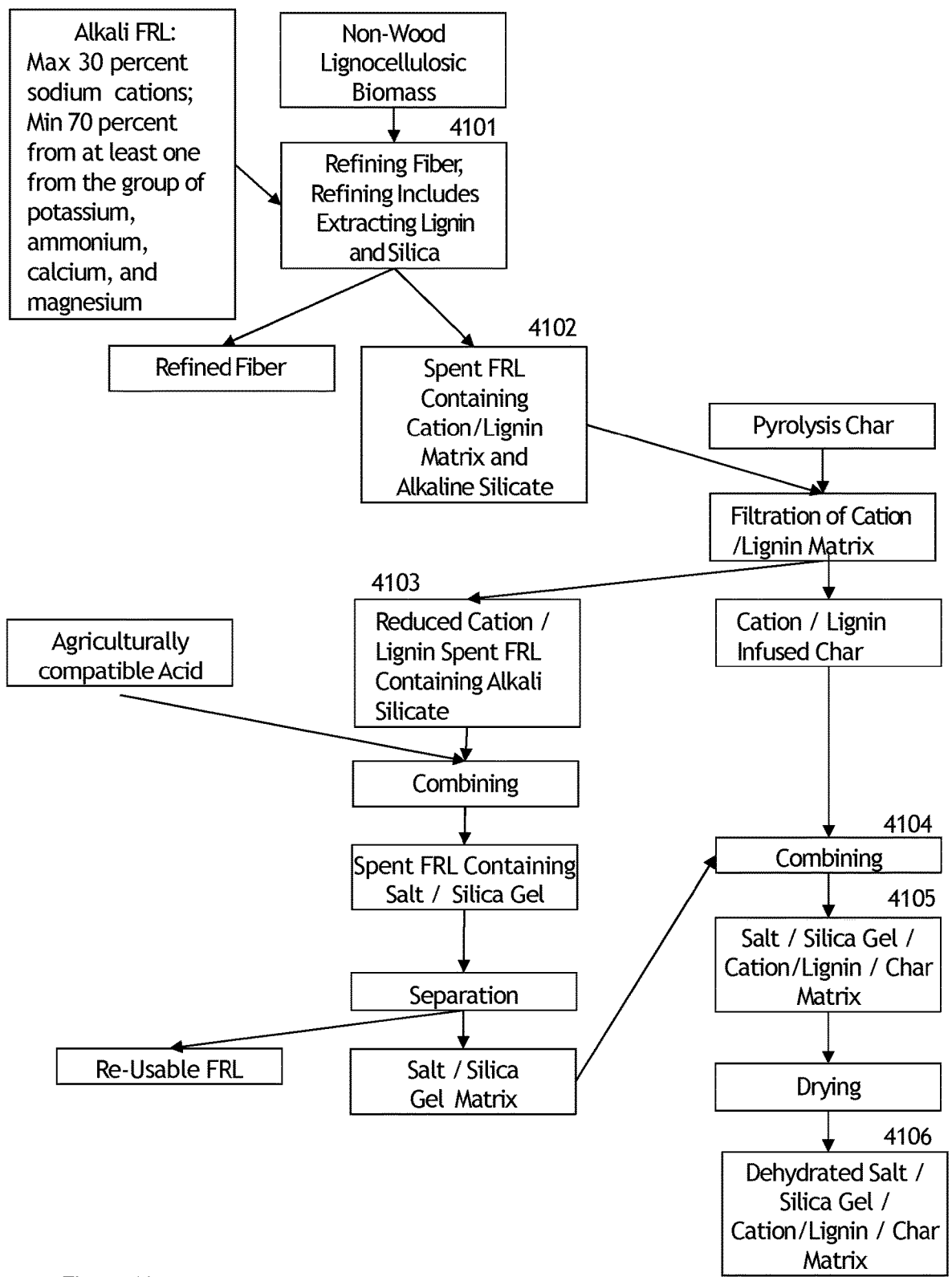

FIG. 41 shows a process as in FIG. 40 wherein the fiber refining process includes the extraction of both lignin and silica, resulting in refined fiber and a spent FRL containing both a alkaline silicate and a cation/lignin matrix; and wherein the spent FRL is filtered with pyrolysis char to extract lignin thereby producing a cation/lignin infused char and a reduced cation/lignin treated spent FRL containing alkali silicate; and in which such treated spent FRL may be additionally treated by combining with an agriculturally compatible acid in such a way to form salts and a silica gel within the treated spent FRL; and in which this double treated spent FRL containing a salt/silica gel matrix may be separated from solution creating a re-usable FRL solution and a salt/silica gel matrix co-product; and which said salt/silica gel matrix co-product may additionally be combined with said cation/lignin infused char matrix to create a salt/silica gel/cation/lignin/char matrix; and in which such a salt/silica gel/cation/lignin/char matrix may be additionally dehydrated to form a dehydrated salt/silica gel/cation/lignin/char matrix.

Figure 42:
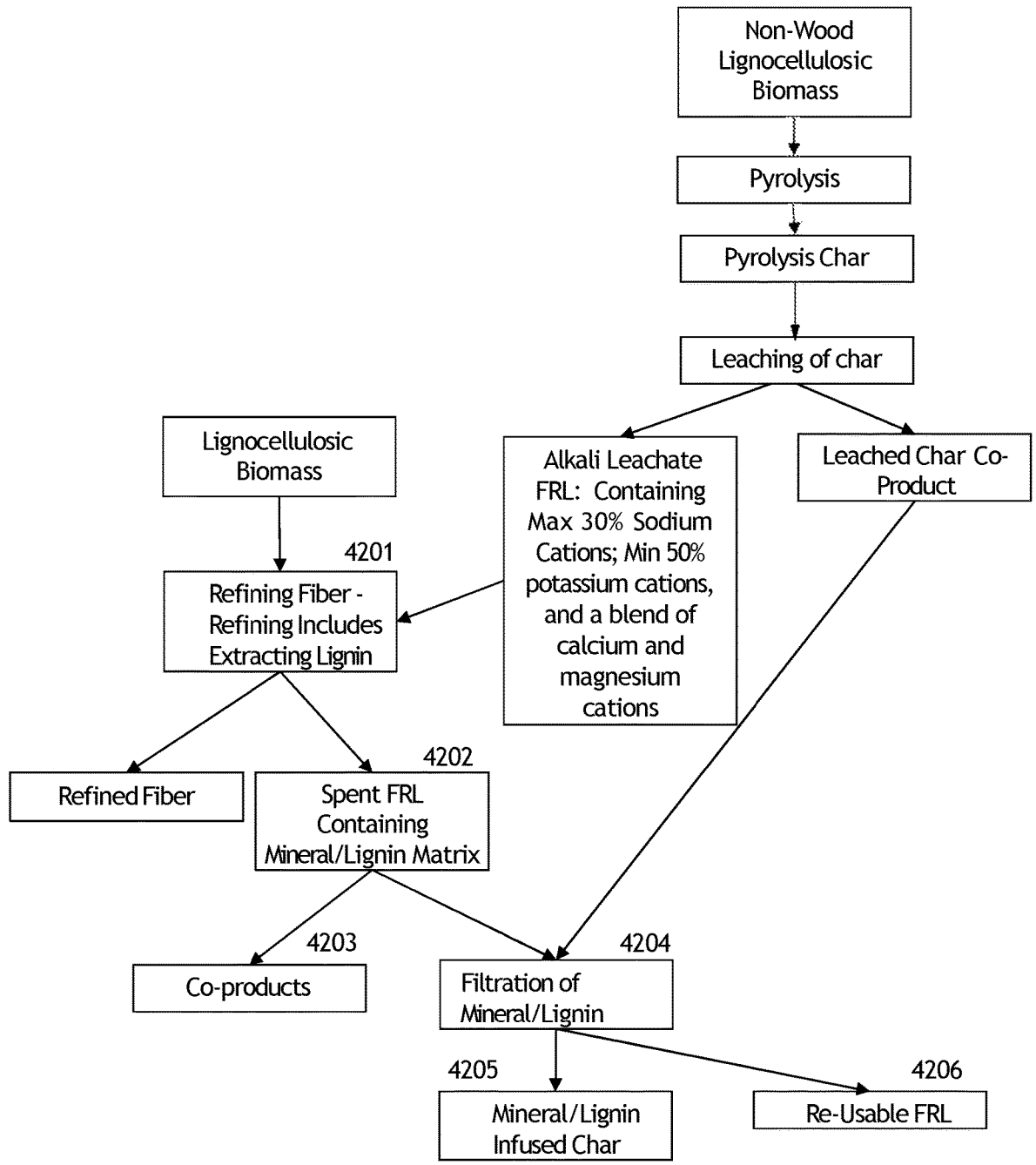

FIG. 42 shows a process as in FIG. 20, in which the refining process includes the extraction of lignin, and in which the spent FRL contains a mineral/lignin matrix which may be used to extract co-products. In addition, the spent FRL may be filtered to remove mineral/lignin matrix using said pyrolysis char as the filter medium, thus yielding mineral/lignin infused char and treated FRL solution which may be reused for fiber refinement.

Figure 43:
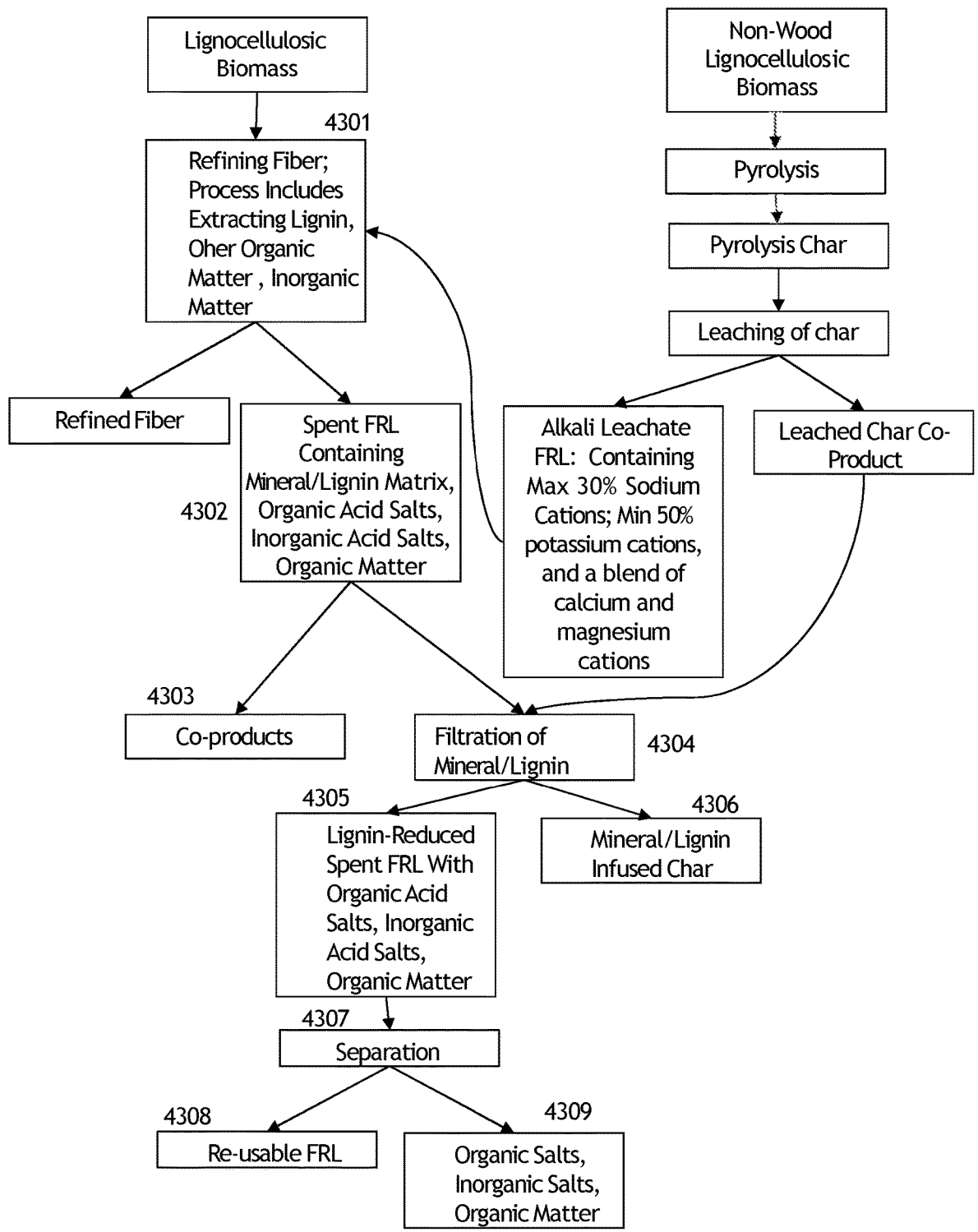

FIG. 43 shows a process as in FIG. 42, in which the refining process includes the extraction of lignin, other organic matter, and minerals, and in which the spent FRL contains a mineral/lignin matrix, organic acid salts, inorganic acid salts, and organic matter. This spent FRL may be used to extract co-products. In addition, the spent FRL may be filtered to remove mineral/lignin matrix using said pyrolysis char as the filter medium, thus yielding mineral/lignin infused char and treated FRL solution containing organic acid salts, in organic acid salts, and organic matter; and such a treated FRL may additionally be treated to remove organic acid salts, inorganic acid salts, and organic matter co-products and a re-usable FRL solution.

Figure 44:
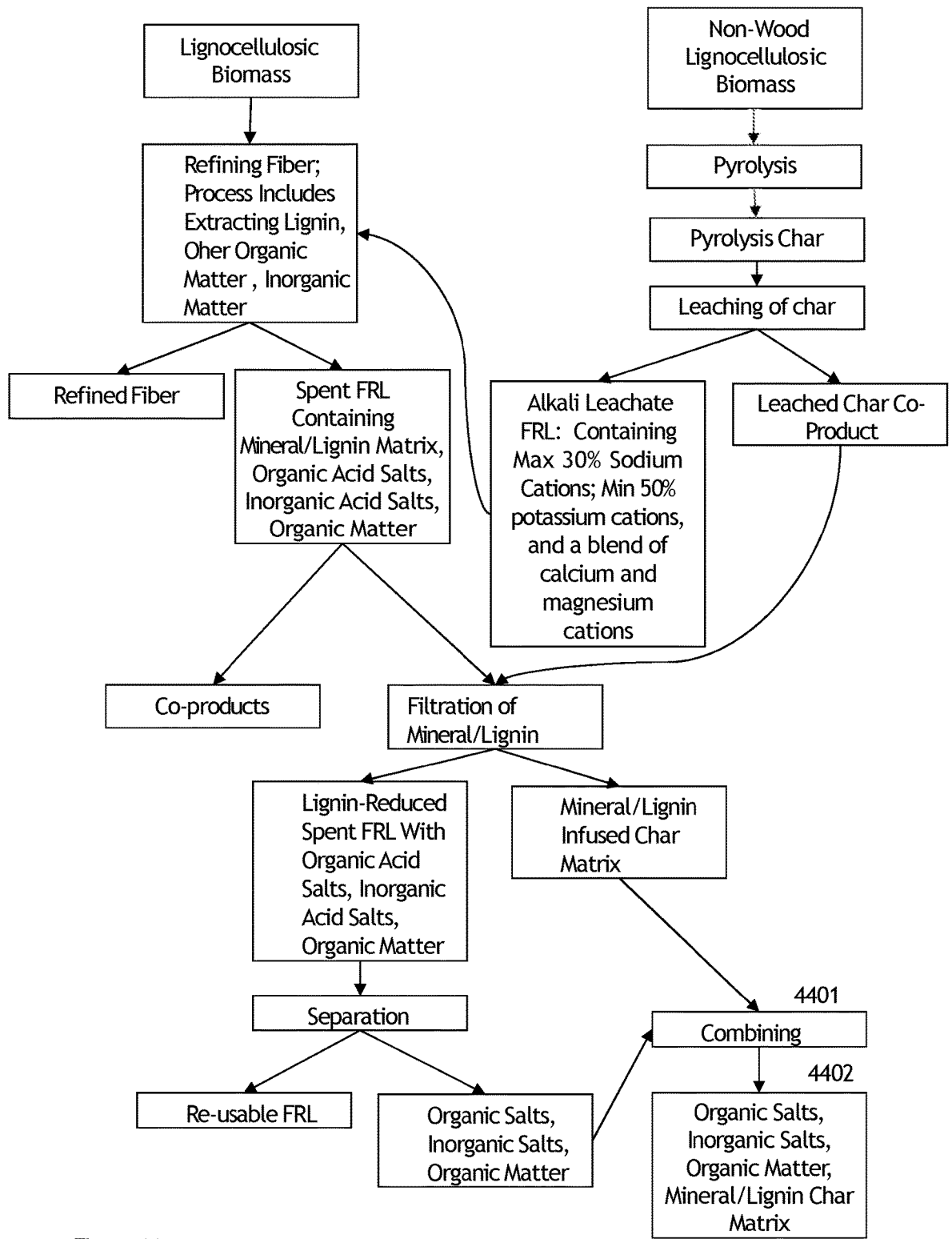

FIG. 44 shows a process as in FIG. 43 wherein the mineral/lignin infused char matrix is combined with the organic acid salts, inorganic acid salts and organic matter to produce an organic acid, inorganic acid, organic matter, mineral/lignin, char matrix.

Figure 45:
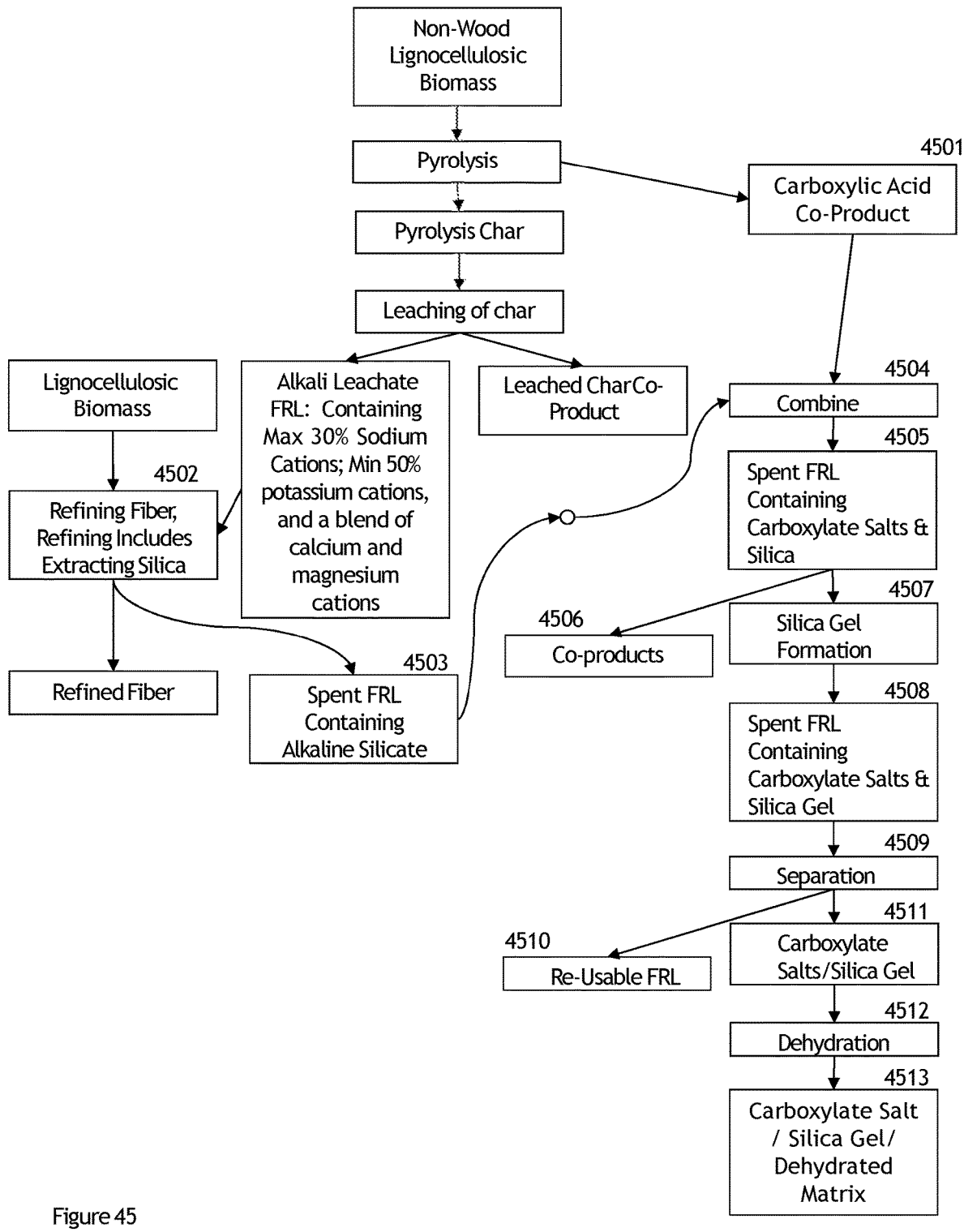

FIG. 45 shows a process as in FIG. 20 wherein the fiber refining process includes the extraction of silica, resulting in refined fiber and a spent FRL containing alkaline silicate; and in which the spent FRL is treated by combining with carboxylic acid derived as co-product from said pyrolysis process creating a spent FRL comprising carboxylate salts, in which co-products may be captured from such solution. Additionally, a gel may be formed from the silica in solution, incorporating such salts, and separated from solution, creating a carboxylate salt/gel matrix and a re-usable FRL solution. In addition, the carboxylate salt/gel matrix may be dehydrated to create a dehydrated carboxylate salt/silica gel matrix.

Figure 46:
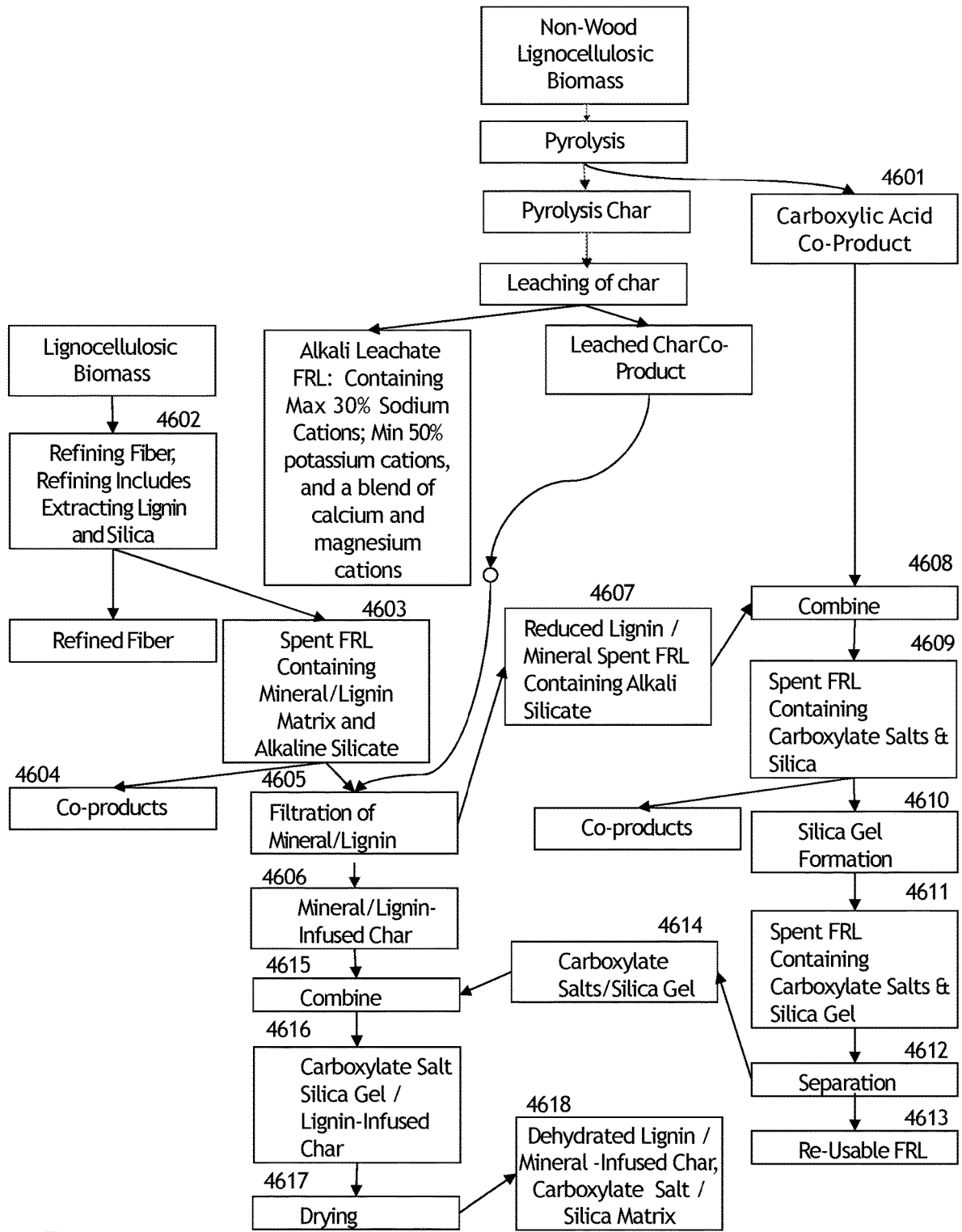

FIG. 46 shows a process as in FIG. 45 wherein the fiber refining process includes the extraction of both lignin and silica, resulting in refined fiber and a spent FRL containing both a alkaline silicate and a mineral/lignin matrix; and wherein the spent FRL is filtered with said pyrolysis char to extract lignin thereby producing a mineral/lignin infused char and a reduced mineral/lignin treated spent FRL containing alkali silicate; and in which such treated spent FRL may be additionally treated by combining with carboxylic acid derived as co-product from said pyrolysis, creating a double treated spent FRL containing carboxylate salt and silica. Such treated spent FRL may undergo a process to form a gel from the silica component, wherein, upon separation, a re-usable FRL solution and a salt/silica gel matrix co-product is created; and, said salt/silica gel matrix may be additionally be combined with said mineral/lignin matrix to produce a carboxylate salt/silica gel/mineral/lignin, char matrix, which dehydrated to form a dehydrated salt/silica gel matrix.

DETAILED DESCRIPTION OF THE INVENTION

The invention is a process for extracting and refining fiber from biomass using a novel FRL. One end result is refined fiber; the other is co-products that result from the spent FRL, and from the treatment of such spent FRL.

Putting this invention process in context, the world is experiencing increasing human populations, increasing rates of fiber consumption, and dwindling natural resources. The world needs alternative fiber sources to deal with these pressing problems.

Non-cotton, non-wood natural fibers may provide one solution, especially when sourced from waste products of the food industry. For every kilogram of food produced globally, approximately one and a half kilograms of food crop waste stays in the field as residue. Such residues have a very low rate of commercial utilization, and create enormous greenhouse gas emissions and dangerous particulate pollution from burning and rotting. These residues contain cellulose fibers, in fact, more fibers by far than the whole current yearly consumption of wood, cotton, and synthetic fibers combined.

In order to bring alternative natural fibers to market in a scaled and relevant way, many challenges must be considered, some of the most important of which include transport logistics; energy, process water, and processing chemicals sourcing; and waste management. In the case of cotton, wood, and synthetics, the fibers are high bulk density and available in concentrated areas, therefore the price of conglomeration and shipping is minimal. The biomass sources from which potential alternative natural fibers derive, on the other hand, are generally low bulk density and already spread out over large distances. This makes collection and long distance shipping expensive. Cotton, wood, and synthetics generally need chemical wet processing before becoming a finished product. Such wet processing infrastructure exists, and is located generally in concentrated areas with sufficient access to process water, wastewater treatment, grid energy, and chemicals. Fibrous biomass residues also require chemical wet processing, but the same support infrastructure does not exist within most areas containing these alternative natural fiber resources.

Current chemical wet processing methods for cotton, wood, synthetics, as well as traditional methods used for non-wood fiber crops, such as purpose-grown hemp or flax, rely on alkaline chemicals, comprising high levels of sodium cations. The spent liquor of such sodium based alkaline wet processing has little to no value, and often incurs large expenses for managing its disposal and consumes an unsustainable amount of water, treatment chemicals, and energy in so doing. Some prior art designates the use of alternative alkaline chemicals like those derived from potassium or ammonium because of their compatibility with agricultural crops, providing a responsible waste management mechanism, but the idea of direct irrigation with such wastewater has long been proven not to be viable because of the expense and logistics involved with transporting large volumes of dilute liquid residues.

In order for alternative natural fibers to enter the marketplace, they must be refined using wet chemistry to eliminate non-fiber natural components. Lignocellulosic biomass residues comprise the largest source of available and unutilized fibers. Such biomass sources typically containing short, repeating units of cellulose elemental fibers, which make bundles of "bast" fibers. These elemental fibers are bonded together, and bonded to non-bast cellulose tissues by gummy interstices.

A chemical wet process, hereafter referred to as fiber refining, may be used to remove some or all of such gummy interstices, and other inorganic tissue components in order to refine the bast fibers to a length and fineness suitable for any specific end use. These fiber refining techniques may be equally applied to blends of bast and non-bast fibers, and to non-bast fibers alone.

The invention disclosed here is a process by which many of the associated problems which restrict the use and growth of the alternative fiber industry may be overcome, although any of the same process may also be used to improve the sustainability of traditional fibers such as cotton or wood.

First, there is the issue of bulk density. Small, localized processing may be one way to increase the bulk density of such biomass. The bast fiber portion of the dry weight of many of these waste sources falls in the 15 to 30 percent range, whereas the pith portion falls in the 50 to 60 percent range. The bast contains much longer, and more desirable fibers than the pith portion, and the bast can be compacted for transport. A system should therefore be developed in order to locally upgrade and ship the bast fiber components of such biomass, and to provide high value local uses for the pith components.

In order to fit into the context of decentralized locations, without the robust manufacturing infrastructure associated with cotton, wood and synthetics industries, an ideal process for fibrous biomass residue resources would entail conserving water through minimal usage and recycling, manufacturing bio-mass biomass-derived chemicals onsite, creating co-products instead of waste products (especially those with relevance for local agricultural and commercial), and generating bio-energy on-site.

In overview, this invention process begins with biomass, refines the biomass through chemical wet processing with an FRL to produce valuable fibers, and results in in a spent FRL with useful co-products contained therein. Optionally, the invention process treats the spent FRL resulting in a treated spent FRL with further useful co-products. Many of the disclosed FRL treatment embodiments also allow for easy transport and usability of the captured co-products, while at the same time allowing for significant re-use of the chemicals, heat energy, and/or water contained within the treated spent FRL.

The process details that follow are exemplary. They illustrate how regardless of embodiment, the refined fiber end products are essentially the same. However, by slightly modifying the FRL components, one can yield different co-products. And, by using some ancillary process steps in conjunction with the main process, one can achieve a reasonable level of self-sustainability. The upshot of the process embodiments is that one is able to refine fiber from biomass sources, using the disclosed FRL, and obtain refined fiber and agriculturally useful co-products as well as deriving more process chemicals from co-products. In an optimal case where local biomass is used and nearly all process chemicals and energy are derived from portions of that biomass, the costs can be reduced to where obtaining these alternative fibers is both profitable and environmentally friendly. In addition, the process is optimized for the use of biomass residues from food crops to fulfill the world's growing needs for alternative fiber sources, and the process not only reduces pollution by reducing the burning or rotting of such residues, but it also, through the process co-products, helps regenerate soils from the biomass production lands.

As shown in FIG. 1, raw material (101) is essentially lignocellulosic biomass. The fibers contained therein are refined (103) using first alkali FRL (102) comprising potassium cations and cations from at least one of the alkaline earth metals, calcium and magnesium, wherein sodium cations are a maximum of 30 percent by cation weight of the said FRL. Once the process concludes, end results comprise refined fiber (104), spent FRL (105) and spent-FRL-based co-products (106). The sodium limitation ensures that the spent FRL may have agricultural applications. Potassium, calcium, and magnesium are all agriculturally compatible minerals. Potassium alkalis are more soluble than equivalent calcium or magnesium alkali chemicals; and the combination cations from potassium with one of these other minerals in a fiber refining liquor results in a longer lasting, and more effective formula than with cations from potassium alone.

As shown in FIG. 2, an alternative embodiment of the process also includes a raw material of essentially lignocellulosic biomass. The fibers therein are refined using a second alkali FRL (201) wherein sodium cations are a maximum of 30 percent by cation weight and a minimum 70 percent of at least one alkaline chemical containing cations from the group of potassium, ammonium, calcium and magnesium cations, and in which the spent FRL is treated (203) by using non-carbonic short-chain carboxylic acid (202) yielding a set of spent FRL-related co-products, including carboxylate salt. Both potassium and ammonium cations provide nutrients essential for plant growth, and limiting the amount of sodium cations in the blend provides for a beneficial agricultural end use for the products of the spent FRL. Although calcium and magnesium cations are not needed in the same high proportion as potassium and nitrogen (from ammonium), these alkaline earth metals are still suitable for agricultural application, and widely used. When any of these cations are combined with short chain non-carbonic carboxylic acids, carboxylic acid salts are formed which are highly desirable for agricultural applications because of their easy assimilation by plants, due to their low molecular weight, and because of the soil structure and soil microorganism building function of the inorganic nutrient and organic carbon sources contained therein. Such ammonium cations may come from synthetic or biomass sources, and may not necessarily be added directly, but may occur due to the reaction of ammonia with water to form ammonium hydroxide, or with urea, which reacts with water to form ammonia, which goes on further to form ammonium hydroxide.

Figure 3:
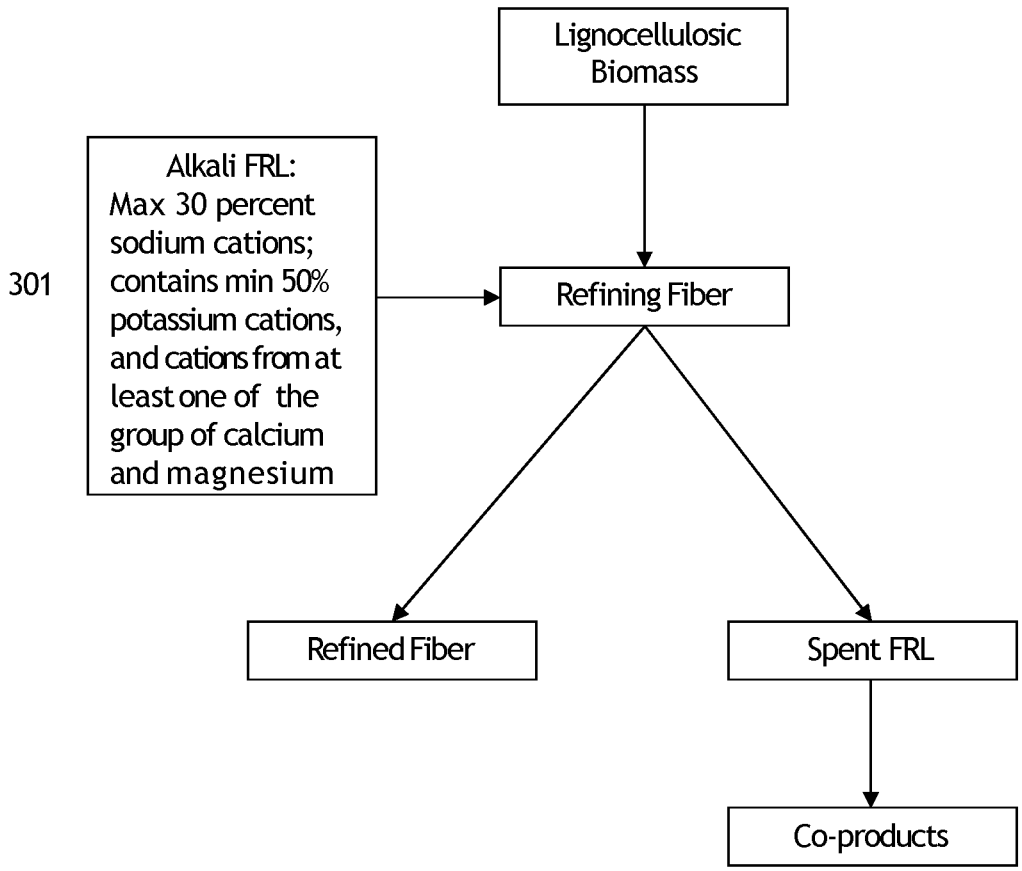

As shown in FIG. 3, the process of FIG. 1 is now limited by an alkali FRL comprising a minimum of 50 percent cations from potassium (301) and at least one of the earth metal calcium or magnesium cations, making the solution high in those elements having the most beneficial value for later agricultural uses. Potassium consists of a more important element required by crops compared to magnesium and calcium, therefore co-products from the spent FRL are more useful in agriculture when the potassium ratio is above 50 percent of the cation portion of the alkali fiber refining liquor formulation.

Figure 4:
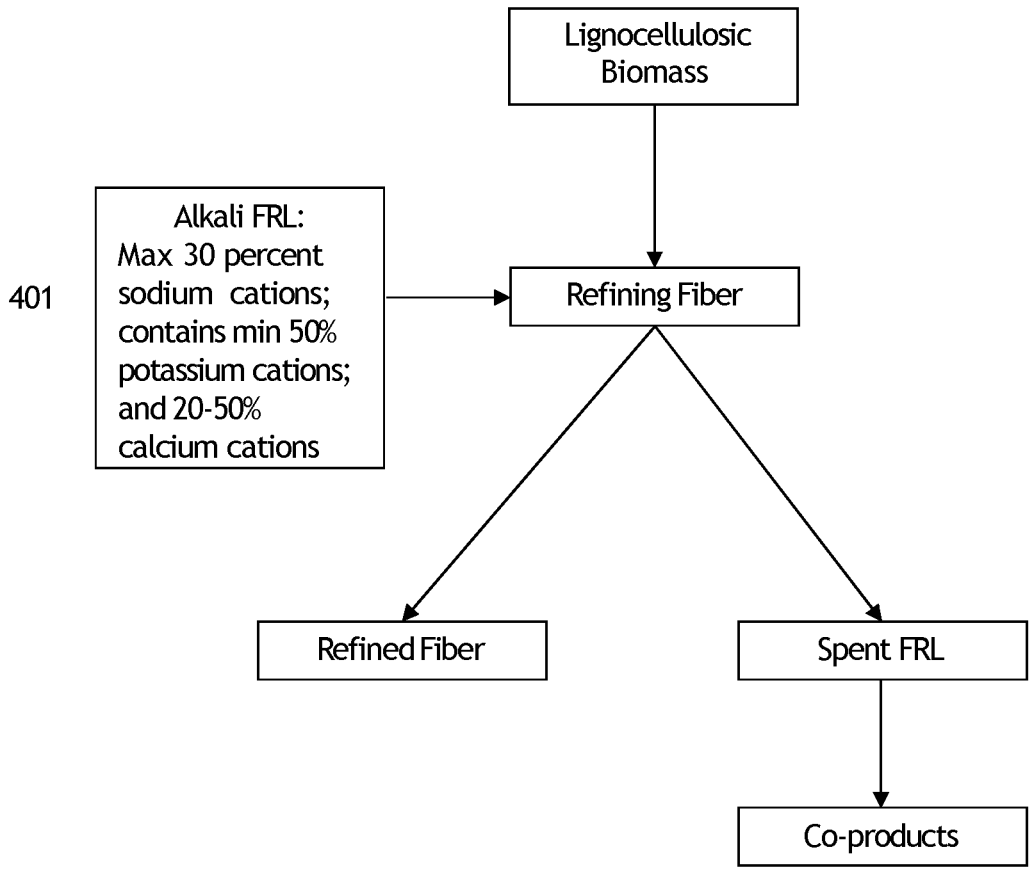
Figure 5:
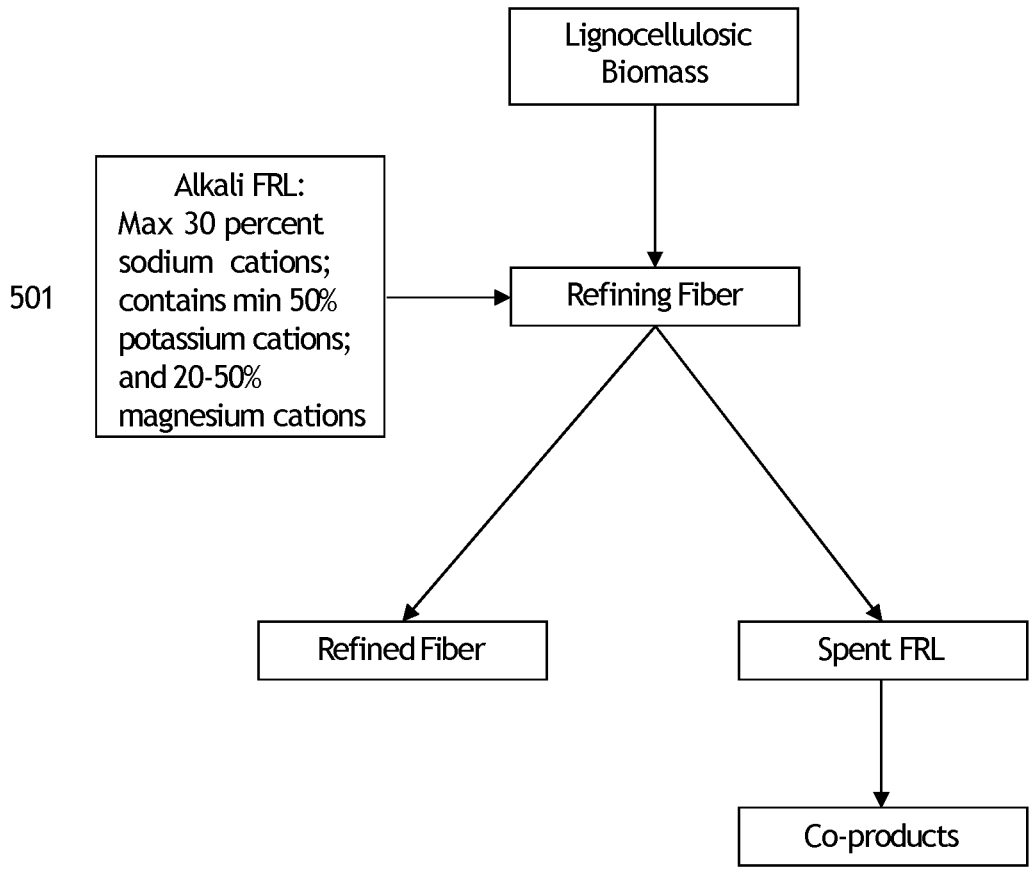

As shown in FIG. 4, the process of FIG. 3 is further limited wherein the alkali FRL (401) uses 20-50 percent calcium cations by weight of the alkali. The fiber-refining effect of the minimum 50 percent proportion of cations comprising potassium, together with the 20-50 percent calcium cations in the blend, positively enhances the level of the strength of the alkali, the non-cellulose matter removal rate, and the preservation of beneficial fiber properties after refining As shown in FIG. 5, the process of FIG. 3 is further limited wherein the alkali FRL (501) uses 20-50 percent magnesium cations by weight of the alkali, for the same reasons as discussed in relation to FIG. 4, since magnesium and calcium both react similarly with the same proportion of cations of potassium in a fiber refining liquor.

Figure 6:
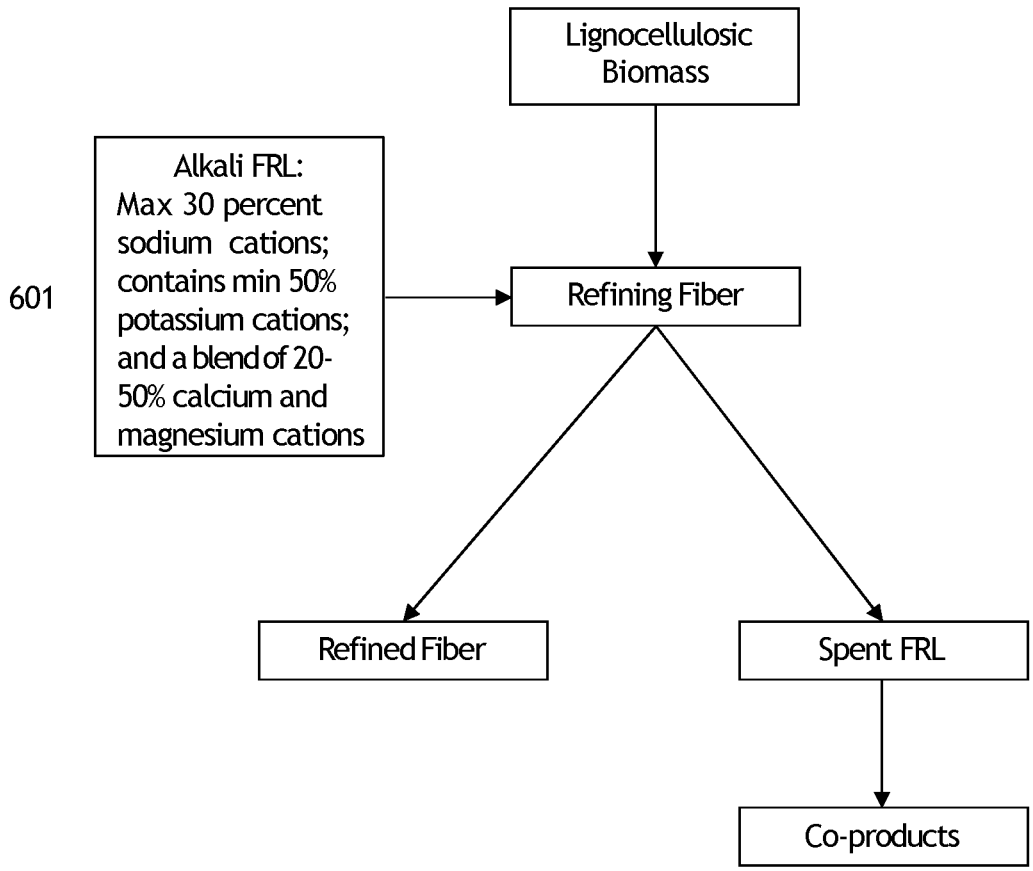

As shown in FIG. 6, the process of FIG. 3 is further limited wherein the alkali FRL (601) uses a blend of 20-50 percent calcium and magnesium by weight of the alkali FRL. Such a three-way formulation is effective as a fiber-refining formula, but the co-products derived from the spent FRL exhibit reduced amounts of both calcium and magnesium thereby supplying a blend of minerals especially suitable for agricultural use.

As shown in FIG. 7, the process of FIG. 1 is further limited wherein the alkali FRL (701) comprises biomass-derived alkaline chemicals and a maximum of 30 percent sodium cations, a minimum of 50 percent cations from potassium cations plus a blend of calcium and magnesium cations. Traditional sources of potassium alkali are derived from the chlor-alkali process, which has the undesirable co-product of a nearly equal amount of chlorine chemicals compared to the amount of potassium alkali chemicals produced. By deriving potassium alkali chemicals from biomass sources, chlorine chemical by-products may be partially or completely avoided and most biomass will contain a desirable blend of a majority potassium and a minority blend of calcium and magnesium cations.

Figure 8:
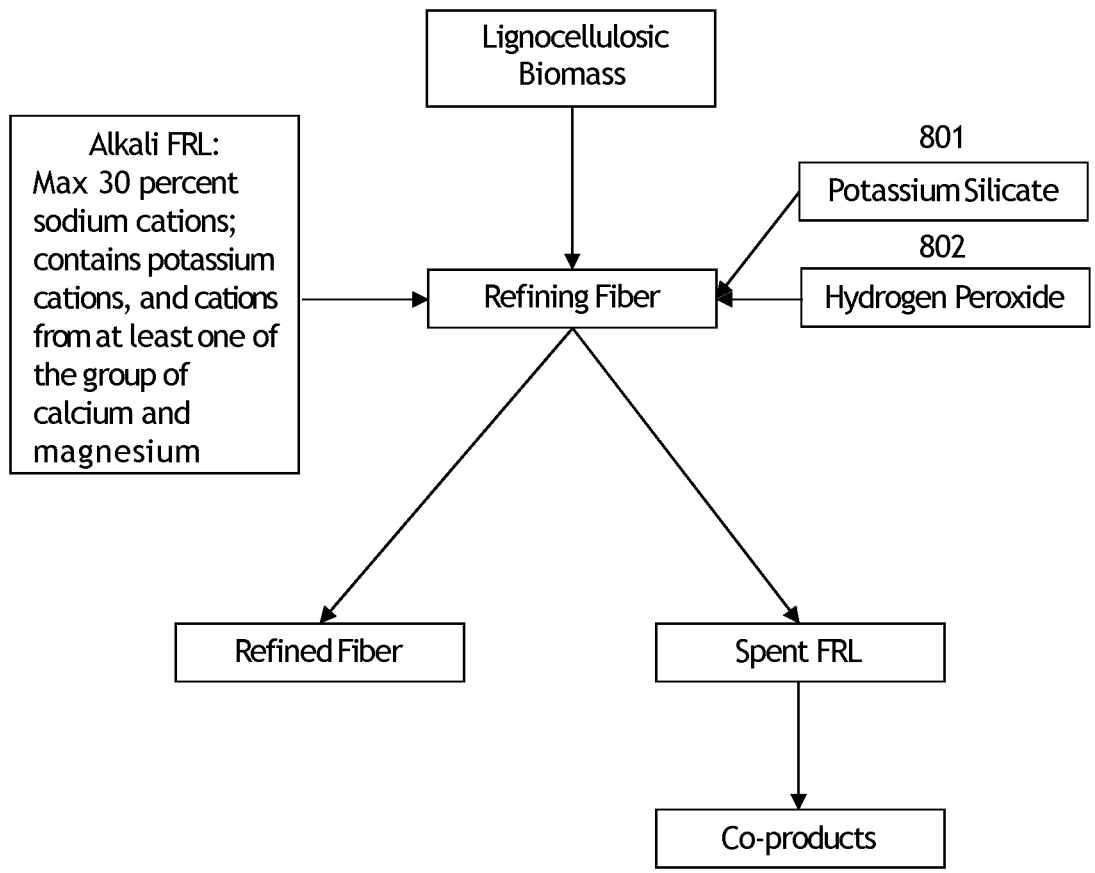
FIG. 8 shows a process as in FIG. 1 with hydrogen peroxide and potassium silicate added to the fiber refining step.

As shown in FIG. 8, the process of FIG. 1 is further limited by adding potassium silicate (801) and hydrogen peroxide (802) to the fiber refining step. Alkaline silicates are known to have detergent actions, which improve the effectiveness of fiber refining liquors. Also, alkaline silicates improve the efficiency of hydrogen peroxide. When using potassium silicate, these desirable effects may be achieved while at the same time optimizing the potassium content of the spent FRL.

Figure 9:
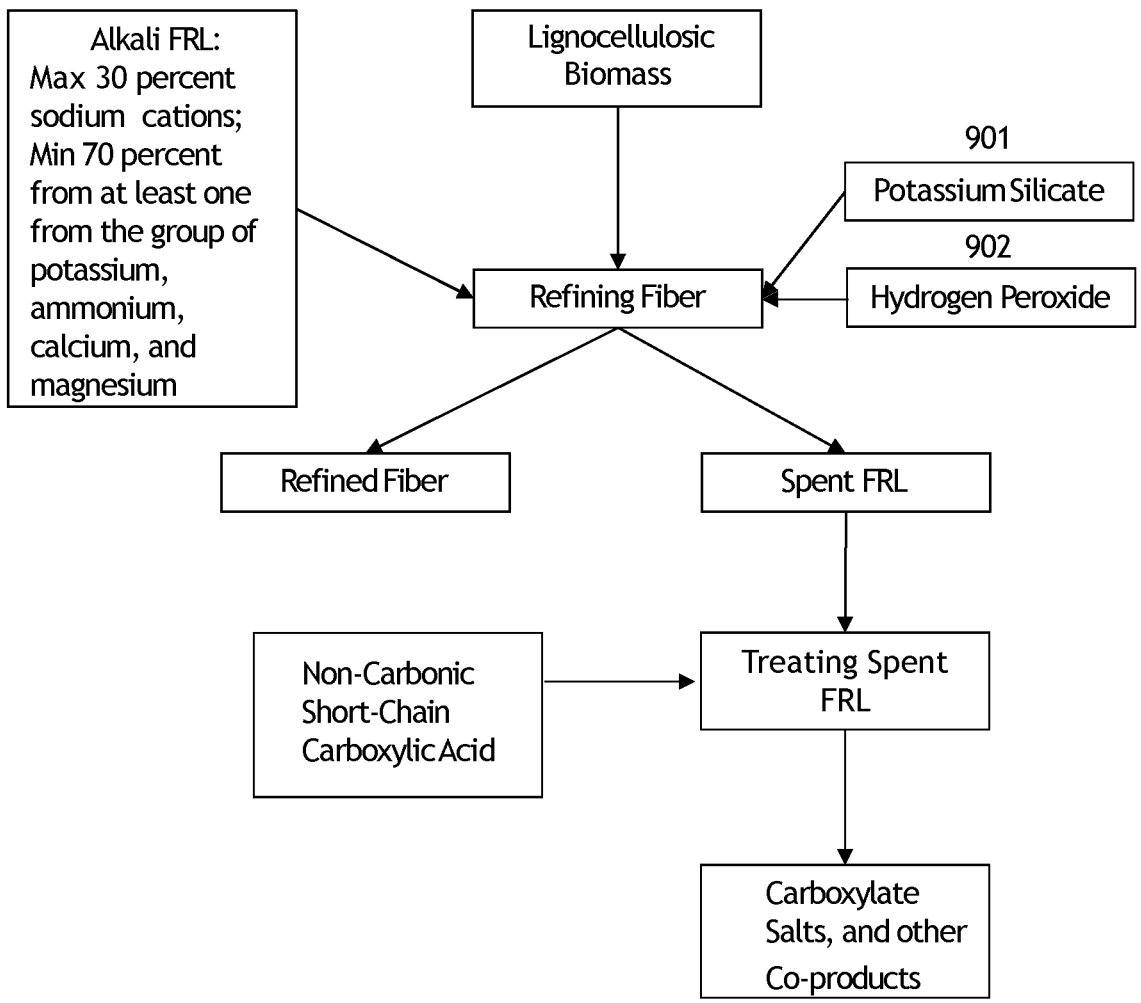
FIG. 9 shows a process as in FIG. 2 with hydrogen peroxide and potassium silicate added to the fiber refining step.

As shown in FIG. 9, the process of FIG. 2 is further limited by adding potassium silicate (901) and hydrogen peroxide (902) to the fiber refining step. The reasoning for the usage of such chemicals follows the same reasoning as explained in relation to FIG. 8.

Figure 10:
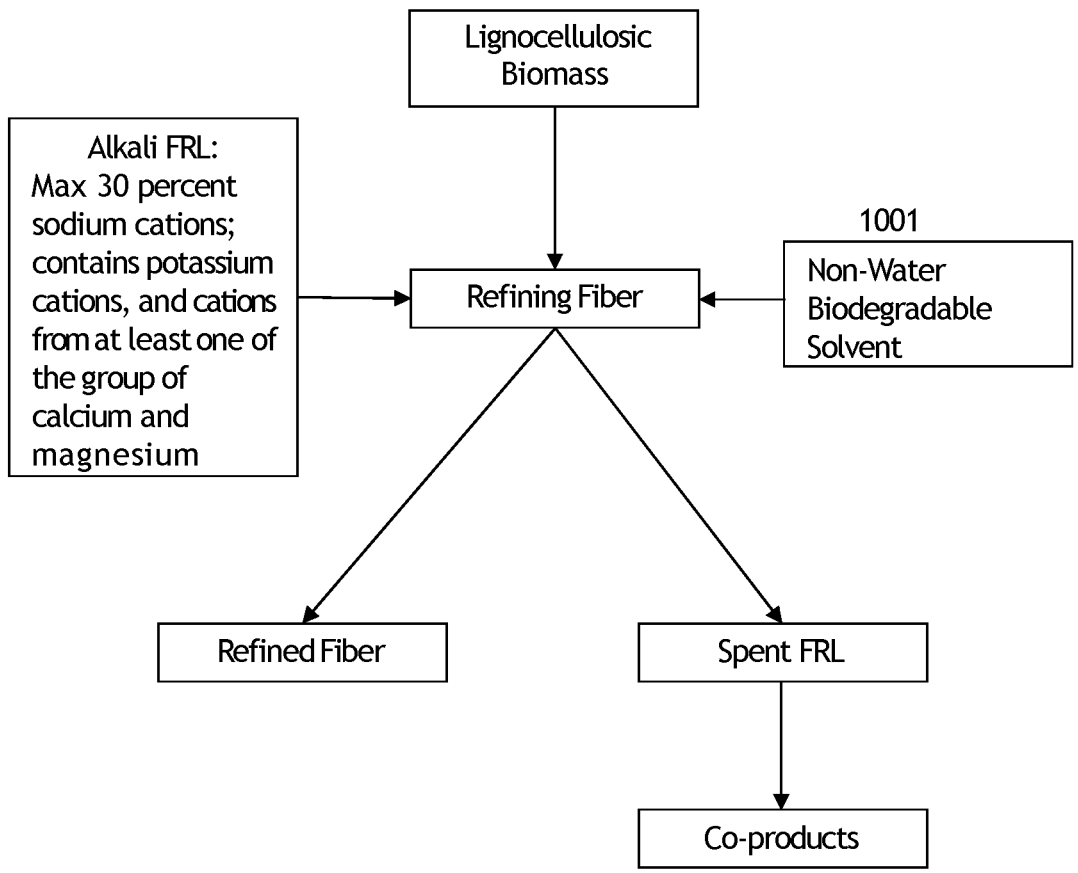
FIG. 10 shows a process as in FIG. 1 with a non-water biodegradable solvent added to a fiber refining step.

As shown in FIG. 10, the process of FIG. 1 is further limited adding a non-water biodegradable solvent (1001) to a fiber refinement step enhancing the refinement. Being biodegradable, such a solvent maintains the spent FRL's compatibility with agricultural supplements. Such a solvent may enhance the action of an alkali FRL liquor, when used together, by both allowing the alkalis to more easily penetrate the tissues of the biomass for the sake of the extraction of non-cellulosic content. Such solvents also may extract lignin more effectively, at lower temperatures, than alkali processes alone, and may be used before or after alkali processes, as well as concurrently with an alkali process.

Figure 11:
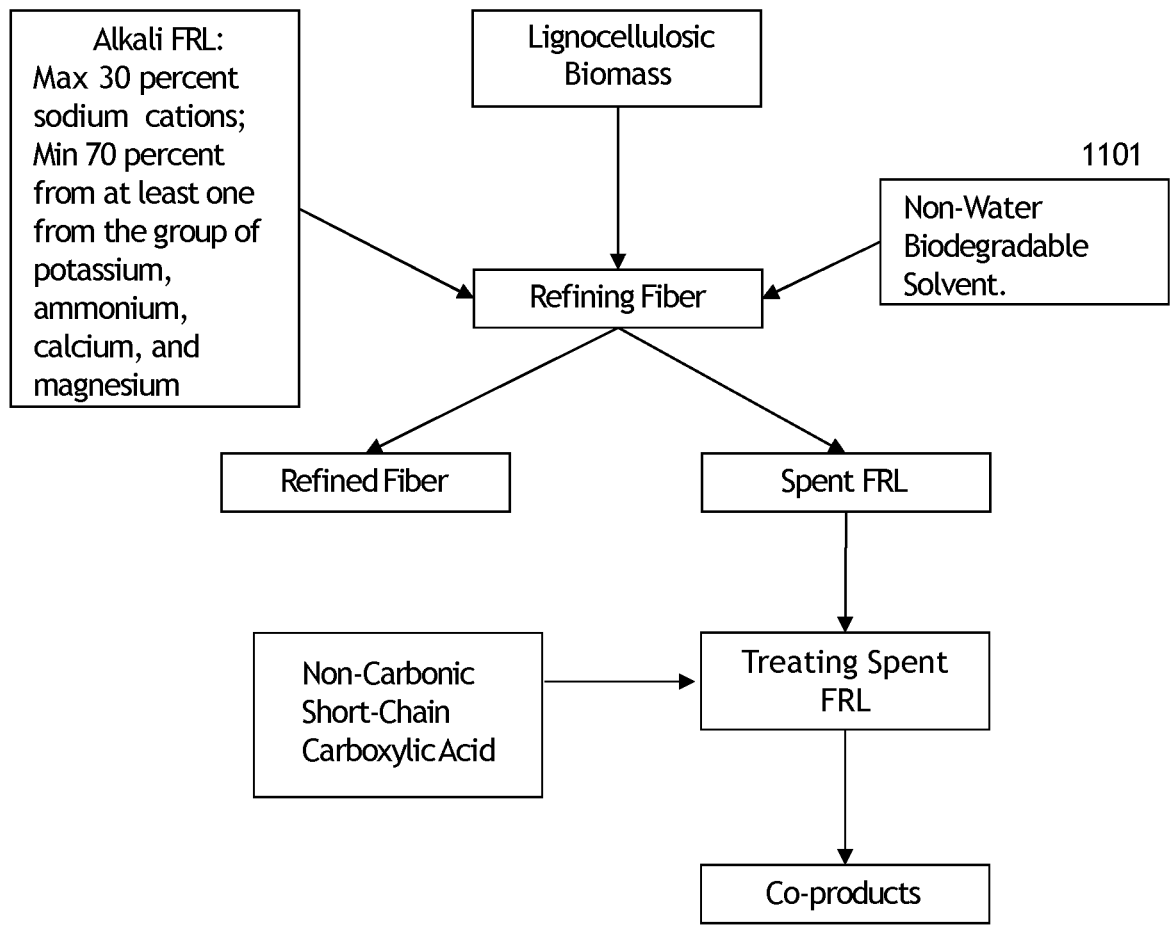
FIG. 11 shows a process as in FIG. 2 with a non-water biodegradable solvent added to a fiber refining step.

As shown in FIG. 11, the process of FIG. 2 is further limited by adding non-water biodegradable solvent (1101) to a fiber refinement step. The advantages of such solvent use are the same here as with the explanations presented in relation to FIG. 10. Examples of non-water biodegradable solvent embodiments, which may be used within this process, include furfural derivatives such as THFA, 2Me-THFA, and gamma-Valerolactone. Ethanol, acetone, glycerine, and mono-alkyl esters of long chain fatty acids are also simple, biodegradable solvents which may be effective in the process.

As shown in FIG. 12, a process embodiment is shown using non-wood lignocellulosic biomass for fiber refining (1201), using the second alkali FRL described in FIG. 2 (1202) of the, in which the refining process causes the extraction of silica, minerals, and organic matter (1203) from such raw material, resulting in semi-refined fiber (1204) and a spent FRL (1205) comprising silica, minerals, and organic matter as a source of new co-products (1206). An additional limitation includes performing a further fiber refinement step (1207), using non-water biodegradable solvent (1208) yielding refined fiber (1211) and a second spent FRL (1209) which yields lignin co-products (1210). When a solvent-based lignin extraction step is used after said alkali fiber refining step, the alkali fiber refining step may be carried out with otherwise lower temperature, pressure, and/or alkalinity. Also, this sequential process derives a higher quality, more pure, lignin co-product, as well as allowing for easier, more complete solvent re-uses in the process. For non-wood biomass, which normally contains a high proportion of silica, an alkali fiber-refining step is often necessary. In wood processing, because of the very low silica content, solvent-based fiber-refining may be performed without an alkali fiber refining step.

As shown in FIG. 13, the process of FIG. 1 is further limited by treating a portion of spent FRL (1302) with non-carbonic carboxylic acid (1301 yielding carboxylate salt and related new co-products (1303). This embodiment has the advantage of containing multiple essential elements, including potassium cations and at least one from the group of calcium and magnesium cations, as well as including the advantages of the soil organic-matter building organic carbon groups contained within the non-carbonic carboxylic acids.

As shown in FIG. 14, the process of FIG. 13 is further limited by neutralizing the treated spent FRL such that its pH is limited to the range of 5.6 to 8.5. A pH of 5.6 to 8.5 is considered by the USDA the normal range of moderate pH soils, and such a pH range resultant within a spent FRL allows for more complete utilization of the spent FRL and related co-products in agriculture.

As shown in FIG. 15, the process of FIG. 2 is further limited by using lignocellulosic biomass-derived pyroligneous acid (1501) for treating spent FRL, producing related co-products. Pyroligneous acid is a mildly acidic co-product of the destructive distillation of lignocellulosic biomass which contains non-carbonic carboxylic acids, as well as dozens of other chemical compounds known to be beneficial as agricultural supplements.

As shown in FIG. 16, the process of FIG. 2 is further limited by using non-carbonic short-chain carboxylic acid (1601) as a spent FRL treatment chemical. Short chain carboxylic acids, those comprising five or less repeating carbons in the acid structure, can penetrate plant tissues more easily than larger molecules, and therefore can provide quicker and more complete access to nutrients.

As shown in FIG. 17, the process of FIG. 16 is further limited by using acetic and formic acid (1701) as spent FRL treatment chemicals. Of all non-carbonic short-chain carboxylic acids, acetic and formic acids are some of the lowest molecular weights, and most commonly available. They are also easily manufactured via simple methods from lignocellulosic biomass, making such a chemical source more available to produce as a localized or on-site option, for more sustainable manufacturing. The blend of acetic and formic acids commonly occur together as co-products during biomass chemical manufacturing, therefore such a blend is not only convenient, but because their acid salts provide different but complementary plant nutrient functions, the blend also performs well for agricultural supplements.

As shown in FIG. 18, the process of FIG. 1 is further limited by treating spent FRL with carbonic acid (1806) resulting from combustion (1802) of fuel (1801) to produce heat energy (1803) which may be used for energy-requiring process steps and the carbonic acid used as a spent FRL treatment chemical. The use of combusted fuel sourced carbonic acid as a method for spent FRL provides energy and reduces emissions by using CO, and it also sequesters carbon as a mineral-inorganic carbon structural component of soil, when the spent FRL or its components are applied as an agricultural supplement.

As shown in FIG. 19, a process embodiment is shown wherein lignocellulosic biomass (1901) is refined (1903) using the second alkaline FRL as described in FIG. 2 (1902) resulting in a refined fiber (1904) and a spent FRL (1905), from which co-products may be derived (1906). The process is further limited by treating spent FRL with carbonic acid (1912) resulting from combustion (1908) of biomass fuel (1907) to produce heat energy (1909) which may be used for energy-requiring process steps (1910) and the carbonic acid used as a spent FRL treatment chemical (1913), thereby producing carbonate salts. Using biomass as the fuel source further lowers the carbon footprint of the system, and allows for the option of more closed-loop production, whereas non-fibrous biomass components may be used for simultaneous fuel and chemical production to assist in upgrading fibrous components of biomass.

As shown in FIG. 20, the first FRL of FIG. 1 is further limited by using a non-wood lignocellulosic biomass derived alkali leachate (2005), comprising a minimum of 50% potassium cations, and a blend of magnesium cations and calcium cations, wherein the alkali leachate results from pyrolysis (2002) of non-wood lignocellulosic biomass (2001) producing pyrolysis char, which then leached (2004) to yield the alkali leachate (2005) and leached char co-products (2006). Non-wood lignocellulosic biomass is widely available globally as a waste resource, generally as a byproduct of the harvest and processing of food crops. Such sources contain a much higher proportion of non-sodium cations than wood sources, and therefore alkali produced from these non-wood sources is a preferred source of alkalis for an agriculturally compatible fiber-refining systems. Capturing biomass alkali by this method, compared to traditional methods of direct combustion of biomass, can reduce pollution and provide opportunities for carbon sequestration and the production of many other agriculturally compatible byproducts.

As shown in FIG. 21, the process of FIG. 20 is further limited by combustion (2101) of leached char co-product to produce heat energy (2102) which may be used in energy-requiring process steps (2103). The many elements removed during the leaching process can improve the efficiency and cleanliness of the combustion process. The removal of chlorine and nitrogen during leaching helps prevent these compounds, some of the main sources of acid rain, from entering the atmosphere. In addition, the removal of minerals such as potassium, sodium, calcium, and magnesium during leaching helps prevent mineral scaling in the flu pipes of combustion units, reducing the need for equipment maintenance and replacement.

As shown in FIG. 22, the process of FIG. 20 is further limited by combusting (2202) the bio-gas (2201) produced by pyrolysis, which then yields heat energy (2203) which may be used in energy-requiring process steps (2204). Such bio-gas, as a co-product of the alkali chemical production process, may be an efficient and clean burning energy source for a sustainable fiber production system.

As shown in FIG. 23, the process of FIG. 20 is further limited by adding an alkali solution (2301), with a composition according to second alkaline FRL of FIG. 2, to the char leaching process step (2302) to produce alkali silicate solution (2303) and reduced-silica char (2304). In addition, such alkali silicate solution may itself be used for fiber refining (2305). Non-wood biomass char will often contain high levels of silica. This silica is not easily extracted by water alone. But extracting the silica with an agriculturally compatible alkali formula, a useful fiber refining chemical may be generated which fits well into the overall system of this process.

As shown in FIG. 24, the process of FIG. 20 further limited wherein the alkali leachate (2401) is used for fiber refining (2402), and also is used for a second leaching (2403) of the leached char co-product, producing an alkali silicate solution (2404) and a reduced silica char co-product (2405); and in which said alkali silicate solution may be used as an additional fiber refining medium (2402)

As shown in FIG. 25, the process of FIG. 23 is further limited by combusting (2501) the reduced-char to produce heat energy (2502) which may be used for energy-requiring process steps (2503). Such a silica-reduced char has the advantage of being easier to burn. Combustion of silica-content biomass causes serious flu pipe scaling problems. Reducing the silica content of combustion fuels again lessens costs associated with equipment repair and replacement.

As shown in FIG. 26, the process of FIG. 20 is further limited by deriving pyroligneous acid (2601) from pyrolysis. This pyroligneous acid, as a co-product of the alkali chemical production, may be used directly as a useful agricultural supplement. It is a proven, effective, bio-sourced fertilizer, and insecticide, among other end uses.

As shown in FIG. 27, the process of FIG. 26 is further limited by using the pyrolysis-derived pyroligneous acid as a chemical in spent FRL treatment (2701) yielding carboxylate salt and other related co-products (2702). The benefits of pyroligneous acid as a spent FRL treatment are further enhanced when the source is a co-product of the alkali chemical production system, thereby simultaneously gaining production efficiencies, and increasing the sustainability of the system.

As shown in FIG. 28, the process of FIG. 26 is further limited by separating (2801) the pyrolysis-derived pyroligneous acid into non-carbonic short-chain carboxylic acid (2802). These non-carbonic carboxylic acids may be used directly as a natural and effective agricultural supplement, and is a valuable and useful co-product of the process.

As shown in FIG. 29, the process of FIG. 28 is further limited by using the pyroligneous acid derived non-carbonic short chain carboxylic acids as spent FRL treatment chemical (2901) yielding carboxylate salts and related co-products (2902). The use of such source of non-carbonic short-chain carboxylic salts within the process reduces costs, improves efficiency of the system, and provides valuable agricultural chemicals.

As shown in FIG. 30, the process of FIG. 26 is further limited by separating pyroligneous acid to derive furfural (3001). Such furfural has beneficial uses as directly as an agricultural supplement, or as a component in a thermoset resin. Such resins may have uses for combining with the fibers refined within this process to create thermoset polymer matrixes.

As shown in FIG. 31, the process of FIG. 30 is further limited by using the pyrolysis-derived furfural as a fiber refinement chemical (3101). Because of the solvent properties of furfural, it may give all the advantages previously discussed for biodegradable solvents, plus the added efficiency, cost-savings and sustainability of being produced as a co-product of both the alkali chemical production system and the pyroligneous acid derived non-carbonic carboxylic acids.

As shown in FIG. 32, the process of FIG. 26 is further limited by hydrogenation (3201) of furfural yielding a furfural derivative (3202). Hydrogenated derivatives of furfural are useful for solvents in agriculture. In addition, they may be also made into resins for combining with fibers from this process.

As shown in FIG. 33, the process of FIG. 32 is further limited by using the furfural derivative as a chemical in fiber refinement (3301). Hydrogenation of furfural creates solvents which have stronger solvent properties than raw furfural and are more effective than raw furfural for both aiding alkali cooking liquors, by helping the alkali penetrate into the biomass tissues, and for removing non-cellulosic substances, especially lignin.

As shown in FIG. 34, the process of FIG. 20 is further limited by using non-bast non-wood biomass (3401) for pyrolysis and derivation of process chemicals whereas non-wood bast biomass (3402) is essentially used as the source of fiber for fiber refinement. Bast fibers are the longer, more valuable fibers contained within lignocellulosic biomass. Generally, lignocellulosics are made up of minority of bast fibers and a majority of non-bast fibers and other non-bast plant elements. Using essentially the non-bast portion of biomass for energy and chemical generation in order to upgrade essentially bast fibers creates a high value use for the non-bast portion of plants, prevents pollution from improper disposal, and helps to make a closed-loop system.

As shown in FIG. 35, a process embodiment is shown wherein fibrous biomass (3501) is refined (3503) using an essentially biomass-derived alkaline FRL with the limitations of the second FRL described in FIG. 2 (3502) resulting in a refined fiber product and a spent FRL (3504), from which co-products may be derived (3506). The process is further limited by treating spent FRL with an essentially biomass-derived acid (3508) which is agriculturally compatible. Agriculturally compatible acids include carboxylic acids, sulfuric acid, phosphoric acid, and nitric acid. In this embodiment, a variety of production methods may be used in order to generate either the alkali FRL, or the spent FRL treatment chemical. For example, if electrolysis is used to generate alkali from a biomass-salt containing solution, a variety of biomass-derived acids may result as co-products. In this embodiment, it is anticipated that a lower market value non-wood crop residue, for example, rice straw, may be used to upgrade a higher value crop residue, for example, hemp straw. Or, in another case, portions of a harvest of whole crop residue, containing both bast and non-bast, may be used to upgrade whole or separated bast and non-bast from the same source of crop residue. For example, a portion of whole corn stover may be used for the chemicals and energy to upgrade the fibers in another portion of whole corn stover. In another example, alkali derived from the bones or shells or other calcium-containing portion of animal products may be used to upgrade fibrous portion of animal products such as feathers or hair.

As shown in FIG. 36, the process of FIG. 35 is further limited by using essentially non-wood non-bast tissue (3602) from non-wood lignocellulosic biomass for FRL used in fiber refinement; and using essentially non-bast tissue from non-wood lignocellulosic biomass (3603) for deriving acid used for spent FRL treatment; and using non-wood bast tissue (3601) as the source of fiber for refinement. This embodiment is intended to cover several situations. For example, it covers a situation wherein the non-cellulosic portions of a source of biomass, for example hemicellulose and lignin, provide the raw material for biochemical generation used to upgrade both the bast and non-bast fibers of a plant. Or in another example, the non-cellulosic portions of both bast and non-bast fibers, plus the non-bast fiber itself, may be used to upgrade the bast. In some cases, the bast and non-bast may be from the same crop. In other cases, not.

FIG. 37 shows an embodiment of the process, beginning with lignocellulosic biomass (3701), refining said biomass in a process which includes the extraction of lignin (3703) via the use of an alkaline FRL (3702) comprising a maximum of 30 percent sodium cations, and the balance of alkali cations essentially composed of cations from the group including potassium, calcium, magnesium, and ammonium; resulting in refined fiber (3704) and a spent FRL (3705) containing a cation/lignin matrix yielding co-products (3707). In addition, the spent FRL may be filtered to remove cation/lignin matrix (3708) using pyrolysis char (3706) as the filter medium, thus yielding cation/lignin infused char (3710) and treated FRL solution which may be reused for fiber refinement (3709). This process allows for a spent FRL formulation highly desirable for agricultural uses, because of its specific alkali cation limitations. The alkali cations bond with lignin within the biomass, forming a cation/lignin matrix. Lignin, in spent liquor, causes difficult wastewater management problems. Because of lignin's high viscosity, a large proportion of this substance needs to be removed from spent liquor in order to re-use the solution. Lignin will clog most membrane-based filtration technologies, and if acidified to precipitate from solution, much of the un-spent alkali in the liquor will be consumed, causing excessive chemical consumption. By using a pyrolysis char filtration method, membrane clogging and pH adjustment can be avoided. In addition, the carbon of the char, when infused with this mineral/lignin matrix, becomes a soil structure building, moisture holding, carbon sequestering, and slow-release fertilizer medium.

FIG. 38 shows a process as in FIG. 37 wherein the fiber refining process includes the extraction of lignin, other organic matter, and minerals (3801); and the spent FRL (3802) comprises a cation/lignin matrix, organic and inorganic acid salts and organic matter yielding co-products. The spent FRL may be treated by filtering using pyrolysis char as the filter medium yielding cation/lignin infused char plus spent FRL (3803) with organic acid salts, inorganic salts and organic matter. This treated spent FRL may be separated (3804) to yield a treated spent FRL which may be reused for fiber refinement (3805), and co-products (3806), comprising organic and inorganic salts and organic matter In some embodiments, such as that described in FIG. 37, the biomass minerals and non-lignin organic matter may be extracted from the cellulose components in a step preceding the lignin extraction. In this embodiment, the biomass minerals and non-lignin organic matter are extracted from the biomass components together with the lignin. The removal of the lignin via the pyrolysis char method has all the advantages previously described in relation to FIG. 37, and allows for easier separation of the other spent FRL components, especially via membrane technologies, which again allows for cleaning of the spent FRL for solution re-use, and for capturing the biomass extracts for commercial use, especially in agriculture.

As shown in FIG. 39, the process of FIG. 38 is further limited by combining (3901) salts and organic matter to yield co-products related to mineral/lignin, salts and organic matter infused char (3902). By combining the salts and the non-lignin organic matter together with the lignin-infused char, the char becomes a carrier for these other biomass extracts when used as an agricultural supplement, enabling more complete uptake of the nutrients by crops through a slow release function, and helping to prevent the leaching of such nutrients into the aquifer.

FIG. 40 shows an embodiment of the process beginning with non-wood lignocellulosic biomass (4001), refining said biomass (4003) with an alkaline FRL(4002) comprising a maximum of 30 percent sodium cations, and the balance of alkali cations essentially composed of cations from the group including potassium, calcium, magnesium, and ammonium, wherein the fiber refining process includes the extraction of silica (4003), resulting in refined fiber (4004) and a spent FRL containing alkaline silicate (4005). The process is further limited by treating said spent FRL by combining (4007) with an agriculturally compatible acid (4006) in such a way as to form salts and a silica gel within the treated spent FRL (4008); and in which the components of such a treated spent FRL may additionally be separated from solution (4009) to create a reusable FRL solution (4010) and a salt/silica gel matrix (4011); and in which the salt/silica gel matrix may additionally be dried (4012) to form a dehydrated salt/silica gel matrix (4013). Non-wood lignocellulosic biomass often has high levels of silica when compared to biomass from trees. Silica removal from non-wood biomass helps improve the quality of the refined fiber for many industrial end-uses, and silica removal is normally achieved through alkali fiber refining treatments. Silica extracts in spent FRLs make the wastewater challenging to deal with. Evaporation of the wastewater, to extract solids, leads to scaling of pipes and high repair or replacement costs. If the silica is not extracted from solution, the high viscosity of the silica-containing solutions can interfere with re-use of the spent FRL solution. The salts produced by the combination of the alkali and acid formulas specified herein make the salts contained within the spent FRL very suitable for agricultural use. A silica gel may be formed, via known methods, in order to aid in the extraction of the silica from solution, and to enable the re-use of the spent FRL. The salts may be combined with the silica gel to become a moisture retaining, slow nutrient release, soil-building fertilizer medium. When the mixture is combined, and dehydrated, the resultant solids become more easily transportable and marketable. Agriculturally compatible acids are those from the group including sulfuric, phosphoric, nitric and carboxylic acids, all of which combine into beneficial salts when combined with the alkali chemicals of this process.

FIG. 41 shows a process as in FIG. 40 wherein the fiber refining process includes the extraction of both lignin and silica (4101), resulting in refined fiber and a spent FRL containing both an alkaline silicate and a cation/lignin matrix (4102); and wherein the spent FRL is filtered with pyrolysis char to extract lignin thereby producing a cation/lignin infused char and a reduced cation/lignin treated spent FRL containing alkali silicate (4103); and in which such treated spent FRL may be additionally treated by combining with an agriculturally compatible acid in such a way to form salts and a silica gel within the treated spent FRL; and in which this double treated spent FRL containing a salt silica gel matrix may be separated from solution creating a reusable FRL solution and a salt/silica gel matrix co-product; and which said salt/silica gel matrix co-product may additionally be combined (4104) with said cation/lignin infused char matrix to create a salt/silica gel/cation/lignin/char matrix (4105); and in which such a salt silica gel/cation/lignin/char matrix may be additionally dehydrated to form a dehydrated salt/silica gel/cation/lignin/char matrix (4106). By combining the complex combination of 2 slow nutrient release, moisture retaining, and soil-structure building mechanisms, the silica and the char, in the same agricultural supplement along with the target agricultural salts and non-lignin organic matter, efficiencies in production, transport, and synergistic beneficial agricultural properties are gained; while at the same time enabling the viable re-use of the spent FRL solution.

FIG. 42 shows a process as in FIG. 20, in which the refining process includes the extraction of lignin (4201), and in which the spent FRL contains a mineral/lignin matrix (4202) which may be used to extract co-products (4203). In addition, the spent FRL may be filtered to remove mineral/lignin matrix (4204) using said pyrolysis char as the filter medium, thus yielding mineral/lignin infused char (4205) and treated FRL solution which may be reused for fiber refinement (4206). This process has the same advantages as discussed in relation to FIG. 37, but has the additional sustainable advantages of comprising a non-wood biomass derived alkali FRL with a co-produced biomass-derived pyrolysis char, again finding high value uses for ordinarily underutilized or polluting materials.

FIG. 43 shows a process as in FIG. 42, in which the refining process includes the extraction of lignin, other organic matter, and minerals (4301), and in which the spent FRL (4302) contains a mineral/lignin matrix, organic acid salts, inorganic acid salts, and organic matter, which may be used to extract co-products (4303). In addition, the spent FRL may be filtered (4304) to remove mineral/lignin matrix using said pyrolysis char as the filter medium, thus yielding mineral/lignin infused char (4306) and treated FRL solution containing organic acid salts, in organic acid salts, and organic matter (4305); and such a treated FRL may additionally be separated (4307) to remove organic acid salts, inorganic acid salts, and organic matter co-products, (4309) producing a re-usable FRL solution (4308). This embodiment has the same closed loop advantages as discussed in relation to FIG. 42 with the co-product advantages as discussed in relation to FIG. 38.

FIG. 44 shows a process as in FIG. 43 wherein the mineral/lignin infused char matrix is combined (4401) with the organic acid salts, inorganic acid salts and organic matter to produce an organic acid, inorganic acid, organic matter, mineral/lignin, char matrix (4402). This embodiment has the same closed loop advantages as discussed in relation to FIG. 42 with the co-product advantages as discussed in relation to FIG. 39.

FIG. 45 shows a process as in FIG. 20 wherein the fiber refining process includes the extraction of silica (4502), resulting in refined fiber and a spent FRL (4503) containing alkaline silicate; and in which the spent FRL is treated by combining (4504) with carboxylic acid (4501) derived as co-product from said pyrolysis process creating a spent FRL comprising carboxylate salts and silica (4505), in which co-products may be captured from such solution (4506). Additionally, a gel may be formed from the silica in solution (4507), incorporating such salts (4508), and separated (4509) from solution, creating a carboxylate salt/gel matrix (4511) and a re-usable FRL solution (4510). In addition, the carboxylate salt/gel matrix may be dehydrated (4512) to create a dehydrated carboxylate salt/silica gel matrix (4513). This embodiment has the additional sustainable element added which is the use of the carboxylic acid co-generated from non-wood biomass during pyrolysis, along with the alkali chemicals used in the FRL. The carboxylic acids from pyroligneous origin may come from the non-carbonic short-chain carboxylic acids present in pyroligneous acid, from carbonic acid derived from combusting any number of pyrolysis-derived fuels, or both. Carbonic acids used in this reaction provide structural carbon to the soil and the non-carbonic short-chain carboxylic acids provide organic carbons to the soil. Both forms of carbon are beneficial to the soil. This embodiment of the process has the same process and product advantages as discussed in relation to FIG. 40 of converting silica in a spent fiber refining liquor from a liability into a significant asset, and creating a novel and useful agricultural supplement. In addition, it includes significant resource savings by taking advantage of non-wood biomass for both the alkali chemical and acid chemical production.

FIG. 46 shows a process as in FIG. 45 wherein the fiber refining process includes the extraction of both lignin and silica (4602), resulting in refined fiber and a spent FRL (4603) containing both a alkaline silicate and a mineral/lignin matrix which can derive associated co-products (4604); and wherein the spent FRL is filtered (4605) with said pyrolysis char to extract lignin thereby producing a mineral/lignin infused char (4606) and a reduced mineral/lignin treated spent FRL containing alkali silicate (4607); and in which such treated spent FRL may be additionally treated by combining (4608) with carboxylic acid (4601) derived as co-product from said pyrolysis, creating a double treated spent FRL containing carboxylate salt and silica (4609). Such treated spent FRL may undergo a process to form a gel from the silica component (4610), whereon, upon separation (4612), a re-usable FRL solution (4613) and a carboxylate salt/silica gel matrix co-product (4614) is created; and, said carboxylate salt/silica gel matrix may be additionally be combined (4615) with said mineral/lignin matrix (4606) to produce a carboxylate salt/silica gel/mineral/lignin, char matrix (4616), which may be dehydrated (4617) to form a dehydrated salt/silica gel matrix (4618). Such an embodiment includes the product and process advantages as described in relation to FIG. 41, and the sustainability advantages as described in relation to FIG. 45.

What is claimed is:

1. A process comprising:
mixing lignocellulosic biomass with an alkaline fiber reducing liquor (FRL) comprising alkaline chemicals with 70 percent or more of said FRL sum total cation molar weight comprising at least one from the group of potassium, ammonium, calcium, and magnesium to produce a lignocellulosic mixture;
limiting said sodium cation percentage to 30 percent or less of total cation molar weight portion of all alkaline chemicals within said FRL;
refining said lignocellulosic mixture resulting in refined fiber and spent FRL containing a cation/lignin matrix;
filtering said spent FRL containing the cation/lignin matrix using pyrolysis char; and producing re-usable FRL and cation/lignin infused char.

2. A process comprising:
mixing lignocellulosic biomass with said alkaline fiber reducing liquor (FRL) to produce a lignocellulosic mixture;
refining said lignocellulosic mixture wherein the process includes extracting lignin and other organic and inorganic matter into a spent FRL containing a cation/lignin matrix
filtering said spent FRL containing the cation/lignin matrix using a pyrolysis char;
thereby producing a lignin-reduced spent FRL comprising organic salts, inorganic salts and organic matter; and
separating said lignin-reduced spent FRL comprising organic salts, inorganic salts and organic matter to produce re-usable FRL and separated organic salts, inorganic salts and organic matter.

3. A process as in claim 2 further comprising:
wherein filtering said spent FRL containing the cation/lignin matrix produces cation/lignin infused char; and combining said separated organic salts, inorganic salts and organic matter with said cation/lignin infused char.

4. A process comprising:
mixing non-wood lignocellulosic biomass with said alkaline fiber reducing liquor (FRL) to produce a non-wood lignocellulosic mixture;
refining said non-wood lignocellulosic mixture wherein the process produces a spent FRL containing a cation/lignin matrix and alkaline silicate;
filtering said spent FRL containing the cation/lignin matrix and alkaline silicate using pyrolysis char so as to reduce the cation/lignin matrix thereby producing a reduced cation/lignin spent FRL containing alkaline silicate;
producing cation/lignin infused char as result of said filtration of said spent FRL containing the cation/lignin matrix and alkaline silicate;
combining one or more of the group of carboxylic acids, sulfuric acid, phosphoric acid, and nitric acid with said reduced cation/lignin spent FRL containing alkaline silicate producing a spent FRL containing salt/silica gel;

separating said spent FRL containing salt/silica gel to produce separate re-usable FRL and a separate salt/silica gel matrix;

combining said separate salt/silica gel matrix with said cation/lignin infused char producing a salt/silica gel/cation/lignin/char matrix;

and drying said salt/silica gel/cation/lignin/char matrix producing a dehydrated salt/silica gel/cation/lignin/char matrix.

* * * * *